(12) United States Patent
Zeng et al.

(10) Patent No.: US 9,413,772 B2
(45) Date of Patent: Aug. 9, 2016

(54) MANAGING ROGUE DEVICES THROUGH A NETWORK BACKHAUL

(71) Applicant: Aerohive Networks, Inc., Sunnyvale, CA (US)

(72) Inventors: Jianlin Zeng, San Jose, CA (US); Mingliang Li, Sunnyvale, CA (US); Peng Fan, Zhejiang (CN)

(73) Assignee: Aerohive Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/216,934

(22) Filed: Mar. 17, 2014

(65) Prior Publication Data

US 2014/0283073 A1    Sep. 18, 2014

Related U.S. Application Data

(60) Provisional application No. 61/802,187, filed on Mar. 15, 2013.

(51) Int. Cl.
*H04L 29/06* (2006.01)

(52) U.S. Cl.
CPC ........ *H04L 63/1408* (2013.01); *H04L 63/1441* (2013.01)

(58) Field of Classification Search
CPC ............ H04L 63/1416; H04L 63/1408; H04L 63/1441
See application file for complete search history.

(56) References Cited

U.S. PATENT DOCUMENTS

| | | | |
|---|---|---|---|
| 5,471,671 A | 11/1995 | Wang et al. | |
| 5,697,059 A | 12/1997 | Carney | |
| 5,726,984 A | 3/1998 | Kubler et al. | |
| 5,956,643 A | 9/1999 | Benveniste | |
| 6,061,799 A | 5/2000 | Eldridge et al. | |
| 6,112,092 A | 8/2000 | Benveniste | |
| 6,154,655 A | 11/2000 | Borst et al. | |
| 6,201,792 B1 | 3/2001 | Lahat | |
| 6,314,294 B1 | 11/2001 | Benveniste | |
| 6,473,413 B1 | 10/2002 | Chiou et al. | |

(Continued)

FOREIGN PATENT DOCUMENTS

| | | |
|---|---|---|
| EP | 1490773 | 1/2013 |
| WO | 2006129287 | 12/2006 |
| WO | 2009141016 | 11/2009 |

OTHER PUBLICATIONS

Clausen, T., et al., "Optimized Link State Routing Protocol (OLSR)," Network Working Group, pp. 1-71, Oct. 2003.

(Continued)

*Primary Examiner* — Jason K. Gee
*Assistant Examiner* — Thanh T Le
(74) *Attorney, Agent, or Firm* — Sheppard, Mullin, Richter & Hampton LLP

(57) ABSTRACT

Managing rogue devices in a network through a network backhaul. A rogue device is detected in a network and a rogue device message that includes the rogue device is sent to a plurality of switches in a backhaul of the network. The rogue device is added into a rogue monitor table. Whether the rogue device is In-Net or Out-Of-Net is determined using forwarding tables of the plurality of switches in the backhaul of the network and the rogue monitor table. Mitigation is performed using a nearest switch to the rogue device of the plurality of switches in the backhaul of the network if it is determined that the rogue device is In-Net.

19 Claims, 14 Drawing Sheets

(56) References Cited

U.S. PATENT DOCUMENTS

| | | |
|---|---|---|
| 6,496,699 B2 | 12/2002 | Benveniste |
| 6,519,461 B1 | 2/2003 | Andersson et al. |
| 6,628,623 B1 * | 9/2003 | Noy .................. H04L 41/0213 370/255 |
| 6,628,938 B1 | 9/2003 | Rachabathuni et al. |
| 6,775,549 B2 | 8/2004 | Benveniste |
| 6,865,393 B1 | 3/2005 | Baum et al. |
| 7,002,943 B2 | 2/2006 | Bhagwat et al. |
| 7,057,566 B2 | 6/2006 | Theobold |
| 7,085,224 B1 | 8/2006 | Oran |
| 7,085,241 B1 | 8/2006 | O'Neill et al. |
| 7,154,874 B2 | 12/2006 | Bhagwat et al. |
| 7,164,667 B2 | 1/2007 | Rayment et al. |
| 7,174,170 B2 | 2/2007 | Steer et al. |
| 7,177,646 B2 | 2/2007 | Corson et al. |
| 7,181,530 B1 | 2/2007 | Halasz et al. |
| 7,216,365 B2 | 5/2007 | Bhagwat et al. |
| 7,224,697 B2 | 5/2007 | Banerjea et al. |
| 7,251,238 B2 | 7/2007 | Joshi et al. |
| 7,336,670 B1 * | 2/2008 | Calhoun ................ H04L 63/10 370/252 |
| 7,339,914 B2 | 3/2008 | Bhagwat et al. |
| 7,346,338 B1 | 3/2008 | Calhoun et al. |
| 7,366,894 B1 | 4/2008 | Kalimuthu et al. |
| 7,370,362 B2 * | 5/2008 | Olson ................ H04L 63/1433 726/25 |
| 7,440,434 B2 | 10/2008 | Chaskar et al. |
| 7,512,379 B2 | 3/2009 | Nguyen |
| 7,536,723 B1 | 5/2009 | Bhagwat et al. |
| 7,656,822 B1 | 2/2010 | AbdelAziz et al. |
| 7,706,789 B2 | 4/2010 | Qi et al. |
| 7,716,370 B1 | 5/2010 | Devarapalli |
| 7,751,393 B2 | 7/2010 | Chaskar et al. |
| 7,768,952 B2 | 8/2010 | Lee |
| 7,793,104 B2 | 9/2010 | Zheng et al. |
| 7,804,808 B2 | 9/2010 | Bhagwat et al. |
| 7,843,907 B1 | 11/2010 | Abou-Emara et al. |
| 7,844,057 B2 | 11/2010 | Meier et al. |
| 7,856,209 B1 | 12/2010 | Rawat |
| 7,921,185 B2 | 4/2011 | Chawla et al. |
| 7,949,342 B2 | 5/2011 | Cuffaro et al. |
| 7,961,725 B2 | 6/2011 | Nagarajan et al. |
| 7,970,894 B1 | 6/2011 | Patwardhan |
| 8,000,308 B2 * | 8/2011 | Dietrich ................ H04L 63/10 370/338 |
| 8,219,688 B2 | 7/2012 | Wang |
| 8,249,606 B1 | 8/2012 | Neophytou et al. |
| 8,493,918 B2 | 7/2013 | Karaoguz et al. |
| 8,789,191 B2 | 7/2014 | Bhagwat et al. |
| 8,824,448 B1 | 9/2014 | Narayana et al. |
| 8,948,046 B2 | 2/2015 | Kang et al. |
| 9,003,527 B2 | 4/2015 | Bhagwat et al. |
| 2001/0006508 A1 | 7/2001 | Pankaj et al. |
| 2002/0012320 A1 | 1/2002 | Ogier et al. |
| 2002/0021689 A1 | 2/2002 | Robbins et al. |
| 2002/0071422 A1 | 6/2002 | Amicangioli |
| 2002/0091813 A1 | 7/2002 | Lamberton et al. |
| 2002/0116463 A1 | 8/2002 | Hart |
| 2002/0128984 A1 | 9/2002 | Mehta et al. |
| 2003/0005100 A1 | 1/2003 | Barnard et al. |
| 2003/0039212 A1 | 2/2003 | Lloyd et al. |
| 2003/0087629 A1 | 5/2003 | Juitt |
| 2003/0104814 A1 | 6/2003 | Gwon et al. |
| 2003/0129988 A1 | 7/2003 | Lee et al. |
| 2003/0145091 A1 | 7/2003 | Peng et al. |
| 2003/0179742 A1 | 9/2003 | Ogier et al. |
| 2004/0003285 A1 * | 1/2004 | Whelan ................ H04L 63/1408 726/23 |
| 2004/0013118 A1 | 1/2004 | Borella |
| 2004/0022222 A1 | 2/2004 | Clisham |
| 2004/0054774 A1 * | 3/2004 | Barber ................ H04L 12/2856 709/224 |
| 2004/0064467 A1 | 4/2004 | Kola et al. |
| 2004/0077341 A1 | 4/2004 | Chandranmenon et al. |
| 2004/0103282 A1 | 5/2004 | Meier et al. |
| 2004/0109466 A1 | 6/2004 | Van Ackere et al. |
| 2004/0162037 A1 | 8/2004 | Shpak |
| 2004/0185876 A1 | 9/2004 | Groenendaal et al. |
| 2004/0192312 A1 | 9/2004 | Li et al. |
| 2004/0196977 A1 | 10/2004 | Johnson et al. |
| 2004/0236939 A1 | 11/2004 | Watanabe et al. |
| 2004/0255028 A1 | 12/2004 | Chu et al. |
| 2005/0053003 A1 | 3/2005 | Cain et al. |
| 2005/0074015 A1 | 4/2005 | Chari et al. |
| 2005/0099983 A1 | 5/2005 | Nakamura et al. |
| 2005/0122946 A1 | 6/2005 | Won |
| 2005/0154774 A1 | 7/2005 | Giaffreda et al. |
| 2005/0207417 A1 | 9/2005 | Ogawa et al. |
| 2005/0262266 A1 | 11/2005 | Wiberg et al. |
| 2005/0266848 A1 | 12/2005 | Kim |
| 2006/0026289 A1 | 2/2006 | Lyndersay et al. |
| 2006/0062250 A1 | 3/2006 | Payne, III |
| 2006/0107050 A1 | 5/2006 | Shih |
| 2006/0117018 A1 | 6/2006 | Christiansen et al. |
| 2006/0140123 A1 | 6/2006 | Conner et al. |
| 2006/0146748 A1 | 7/2006 | Ng et al. |
| 2006/0146846 A1 | 7/2006 | Yarvis et al. |
| 2006/0165015 A1 | 7/2006 | Melick et al. |
| 2006/0187949 A1 | 8/2006 | Seshan et al. |
| 2006/0221920 A1 | 10/2006 | Gopalakrishnan et al. |
| 2006/0233128 A1 | 10/2006 | Sood et al. |
| 2006/0234701 A1 | 10/2006 | Wang et al. |
| 2006/0245442 A1 | 11/2006 | Srikrishna et al. |
| 2006/0268802 A1 | 11/2006 | Faccin |
| 2006/0294246 A1 | 12/2006 | Stieglitz et al. |
| 2007/0004394 A1 | 1/2007 | Chu et al. |
| 2007/0010231 A1 | 1/2007 | Du |
| 2007/0025274 A1 | 2/2007 | Rahman et al. |
| 2007/0025298 A1 | 2/2007 | Jung |
| 2007/0077937 A1 | 4/2007 | Ramakrishnan et al. |
| 2007/0078663 A1 | 4/2007 | Grace |
| 2007/0082656 A1 | 4/2007 | Stieglitz et al. |
| 2007/0087756 A1 | 4/2007 | Hoffberg |
| 2007/0091859 A1 | 4/2007 | Sethi et al. |
| 2007/0115847 A1 | 5/2007 | Strutt et al. |
| 2007/0116011 A1 | 5/2007 | Lim et al. |
| 2007/0121947 A1 | 5/2007 | Sood et al. |
| 2007/0133407 A1 | 6/2007 | Choi et al. |
| 2007/0140191 A1 | 6/2007 | Kojima |
| 2007/0153741 A1 | 7/2007 | Blanchette et al. |
| 2007/0156804 A1 | 7/2007 | Mo |
| 2007/0171885 A1 | 7/2007 | Bhagwat et al. |
| 2007/0192862 A1 * | 8/2007 | Vermeulen .......... H04L 63/0236 726/23 |
| 2007/0249324 A1 | 10/2007 | Jou et al. |
| 2007/0263532 A1 | 11/2007 | Mirtorabi et al. |
| 2007/0280481 A1 | 12/2007 | Eastlake et al. |
| 2007/0288997 A1 | 12/2007 | Meier et al. |
| 2008/0002642 A1 | 1/2008 | Borkar et al. |
| 2008/0037552 A1 | 2/2008 | Dos Remedios et al. |
| 2008/0080369 A1 | 4/2008 | Sumioka |
| 2008/0080377 A1 | 4/2008 | Sasaki et al. |
| 2008/0090575 A1 | 4/2008 | Barak et al. |
| 2008/0095094 A1 | 4/2008 | Innami |
| 2008/0107027 A1 | 5/2008 | Allan et al. |
| 2008/0109879 A1 | 5/2008 | Bhagwat et al. |
| 2008/0130495 A1 | 6/2008 | Dos Remedios et al. |
| 2008/0146240 A1 | 6/2008 | Trudeau |
| 2008/0170527 A1 | 7/2008 | Lundsgaard et al. |
| 2008/0207215 A1 | 8/2008 | Chu et al. |
| 2008/0225857 A1 | 9/2008 | Lange |
| 2008/0229095 A1 | 9/2008 | Kalimuthu et al. |
| 2008/0240128 A1 * | 10/2008 | Elrod ..................... H04L 12/64 370/401 |
| 2008/0253370 A1 | 10/2008 | Cremin et al. |
| 2008/0273520 A1 | 11/2008 | Kim et al. |
| 2009/0019521 A1 | 1/2009 | Vasudevan |
| 2009/0028052 A1 | 1/2009 | Strater et al. |
| 2009/0043901 A1 | 2/2009 | Mizikovsky et al. |
| 2009/0082025 A1 | 3/2009 | Song |
| 2009/0088152 A1 | 4/2009 | Orlassino |
| 2009/0097436 A1 | 4/2009 | Vasudevan et al. |
| 2009/0111468 A1 | 4/2009 | Burgess et al. |
| 2009/0113018 A1 | 4/2009 | Thomson et al. |

(56) References Cited

U.S. PATENT DOCUMENTS

| | | |
|---|---|---|
| 2009/0141692 A1 | 6/2009 | Kasslin et al. |
| 2009/0144740 A1 | 6/2009 | Gao |
| 2009/0168645 A1 | 7/2009 | Tester et al. |
| 2009/0172151 A1* | 7/2009 | Davis ............... H04L 29/12264 709/224 |
| 2009/0239531 A1 | 9/2009 | Andreasen et al. |
| 2009/0240789 A1 | 9/2009 | Dandabany |
| 2009/0247170 A1 | 10/2009 | Balasubramanian et al. |
| 2009/0310557 A1 | 12/2009 | Shinozaki |
| 2010/0046368 A1 | 2/2010 | Kaempfer et al. |
| 2010/0057930 A1 | 3/2010 | DeHaan |
| 2010/0112540 A1 | 5/2010 | Gross et al. |
| 2010/0115576 A1 | 5/2010 | Hale et al. |
| 2010/0132040 A1 | 5/2010 | Bhagwat et al. |
| 2010/0208614 A1 | 8/2010 | Harmatos |
| 2010/0228843 A1 | 9/2010 | Ok et al. |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana et al. |
| 2010/0304738 A1 | 12/2010 | Lim et al. |
| 2010/0311420 A1 | 12/2010 | Reza et al. |
| 2010/0322217 A1 | 12/2010 | Jin et al. |
| 2010/0325720 A1* | 12/2010 | Etchegoyen ......... H04L 63/1408 726/17 |
| 2011/0004913 A1 | 1/2011 | Nagarajan et al. |
| 2011/0040867 A1 | 2/2011 | Kalbag |
| 2011/0055326 A1 | 3/2011 | Michaelis et al. |
| 2011/0055928 A1* | 3/2011 | Brindza ............... H04W 12/08 726/26 |
| 2011/0064065 A1 | 3/2011 | Nakajima et al. |
| 2011/0182225 A1 | 7/2011 | Song et al. |
| 2011/0185231 A1 | 7/2011 | Balestrieri et al. |
| 2011/0258641 A1* | 10/2011 | Armstrong ............ G06F 13/385 719/327 |
| 2012/0014386 A1 | 1/2012 | Xiong et al. |
| 2012/0290650 A1 | 11/2012 | Montuno et al. |
| 2013/0003729 A1* | 1/2013 | Raman ............... H04L 12/6418 370/389 |
| 2013/0003739 A1* | 1/2013 | Raman .................. H04L 45/02 370/392 |
| 2013/0028158 A1 | 1/2013 | Lee et al. |
| 2013/0059570 A1* | 3/2013 | Hara .................... H04W 4/001 455/414.1 |
| 2013/0086403 A1* | 4/2013 | Jenne .................... G06F 1/3278 713/324 |
| 2013/0103833 A1 | 4/2013 | Ringland et al. |
| 2013/0250811 A1* | 9/2013 | Vasseur ............... H04W 40/023 370/255 |
| 2014/0269327 A1 | 9/2014 | Fulknier et al. |
| 2014/0298467 A1 | 10/2014 | Bhagwat et al. |
| 2015/0120864 A1 | 4/2015 | Unnimadhavan et al. |

OTHER PUBLICATIONS

He, Changhua et al., "Analysis of the 802.11i 4-Way Handshake," Proceedings of the 3rd ACM Workshop on Wireless Security, pp. 43-50, Oct. 2004.

Lee, Jae Woo et al, "z2z: Discovering Zeroconf Services Beyond Local Link," 2007 IEEE Globecom Workshops, pp. 1-7, Nov. 26, 2007.

Perkins, C., et al., "Ad hoc On-Demand Distance Vector (AODV) Routing," Network Working Group, pp. 1-35, Oct. 2003.

International Application No. PCT/US2008/061674, International Search Report and Written Opinion mailed Oct. 14, 2008.

International Application No. PCT/US2011/047591, International Search Report and Written Opinion mailed Dec. 19, 2011.

International Application No. PCT/US2012/059093, International Search Report and Written Opinion mailed Jan. 4, 2013.

Chirumamilla, Mohan K. et al., "Agent Based Intrusion Detection and Response System for Wireless LANs," CSE Conference and Workshop Papers, Paper 64, Jan. 1, 2003.

Craiger, J. Philip, "802.11, 802.1x, and Wireless Security," SANS Institute InfoSec Reading Room, Jun. 23, 2002.

Finlayson, Ross et al., "A Reverse Address Resolution Protocol," Nework Working Group, Request for Comments: 903 (RFC 903), Jun. 1984.

Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.

European Patent Application No. 12879114.2, Search Report mailed Jan. 21, 2016.

\* cited by examiner

MANAGING ROGUE DEVICES THROUGH A NETWORK BACKHAUL

CROSS-REFERENCE TO RELATED APPLICATIONS

The present application claims priority to U.S. Provisional Patent Application Ser. No. 61/802,187, filed Mar. 15, 2013 and entitled "Use Probe to Detect Nearest Switch for WIPS Mitigation," which is incorporated by reference herein.

BACKGROUND

An area of ongoing research and development is in managing rogue devices in a network. Rogue devices can include either or both rogue access points and rogue client devices.

Due to the highly mobile character of rogue access points and rogue client devices problems exist with managing rogue devices in a network. In particular problems exist with determining locations of rogue access points and rogue client devices in a network due to the high mobility character of rogue devices. There therefore exists a need for improved systems and methods for determining locations of rogue access points and rogue clients in a network. Further, problems exist with mitigating rogue access points and rogue client devices in a network due to the highly mobile character of the rogue devices. There therefore exists a need for improved systems and methods for mitigating rogue access points and rogue client devices in a network.

The foregoing examples of the related art and limitations related therewith are intended to be illustrative and not exclusive. For example, wireless clients may use different protocols other than 802.11, potentially including protocols that have not yet been developed. However, problems associated with multiple authentications may persist. Other limitations of the relevant art will become apparent to those of skill in the art upon reading the specification and studying of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for managing rogue devices in a network through a backhaul of the network. In various implementations, a rogue device is detected in a network and a rogue device message that includes an identification of the rogue device is sent to a plurality of switches in a backhaul of the network. Further, in various implementations, the rogue device is added into a rogue monitor table. In various implementations, whether the rogue device is In-Net or Out-Of-Net is determined using forwarding tables of the plurality of switches in the backhaul of the network and the rogue monitor table. Additionally, in various implementations, mitigation is performed using a nearest switch to the rogue device of the plurality of switches in the backhaul of the network if it is determined that the rogue device is In-Net.

These and other advantages will become apparent to those skilled in the relevant art upon a reading of the following descriptions and a study of the several examples of the drawings.

DETAILED DESCRIPTION

Figure 1:
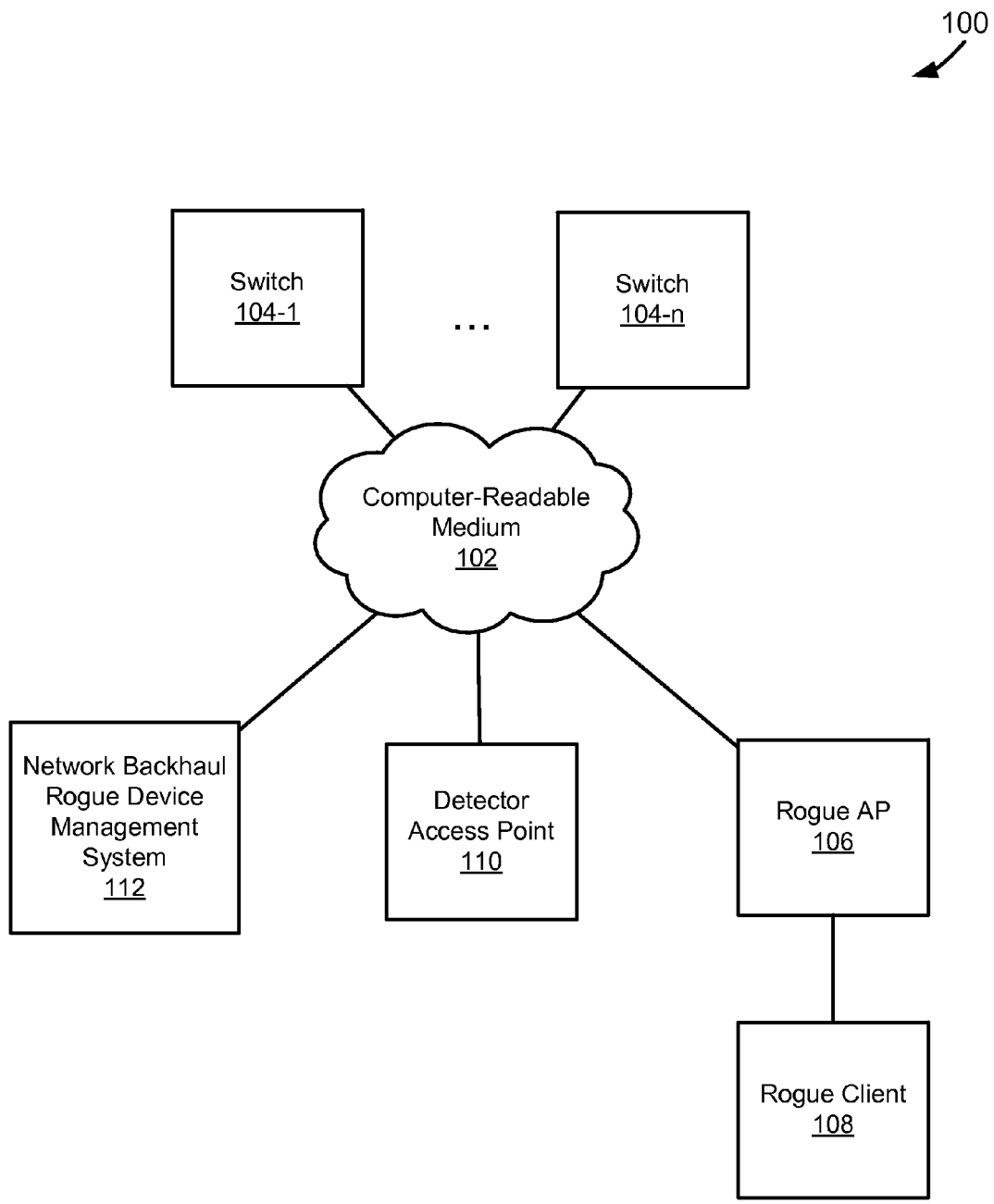
FIG. 1 depicts a diagram of an example of a system for managing rogue devices coupled to a network through a backhaul of the network.

FIG. 1 depicts a diagram 100 of an example of a system for managing rogue devices coupled to a network through a backhaul of the network. The example system shown in FIG. 1 includes a computer-readable medium 102, switches 104-1 . . . 104-n hereinafter collectively referred to as "switches 104," a rogue access point 106 hereinafter referred to as "AP," a rogue client device 108, a detector access point 110, and a network backhaul rogue device management system 112.

In the example system shown in FIG. 1, the rogue client device 108 is coupled to the rogue AP 106 and the rogue AP 106, the switches 104, the detector access point 110 and the network backhaul rogue device management system are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a network.

Assuming the computer-readable medium 102 includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a computer-readable medium 102 that may or may not include more than one private network.

The computer-readable medium 102, the rogue AP 106, the rogue client device 108, the detector access point 110, the network backhaul rogue device management system 112 and other systems, or devices described in this paper can be implemented as a computer system or parts of a computer system or a plurality of computer systems. A computer system, as used in this paper, is intended to be construed broadly and can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific, configuration-specific, or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the FIGs. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the client device 104 is an applicable device that functions to send data to and receive data from a network. The client device 104 can send and receive data through a network device that is part of a network. Depending upon implementation-specific, or other considerations, the client device 104 can be a thin client device or an ultra-thin client device. Data sent and receive by the client device 104 can be used in executing applications, e.g. a web browser or Apple FACETIME®, on the client device 104.

In a specific implementation, the switches 104 function to transmit data and route data as part of a network. In transmitting and routing data as part of a network, the switches 104 form at least part of a backhaul of the network. The switches 104 can function to transmit data to and from access points and client devices coupled to the access points. Data transmitted by the switches 104 can be used in providing services to a client device through a network.

In a specific implementation, the rogue AP 106 functions to transmit data between a client device and a network. In transmitting data between a client device and a network, the rogue AP 106 can couple the client device to the network. The rogue AP 106 can functions as a router by transmitting data between multiple client devices coupled to the rogue AP 106. The rogue AP 106 can be a rogue device. The rogue AP can be a rogue device because it is not authorized to send and receive data through a network.

In a specific implementation, the rogue client device 108 functions to send and receive data through a network. The rogue client device 108 is a rogue device. Depending upon implementation-specific or other considerations, the rogue client device 108 can be a rogue device because it is not authorized to send and receive data through a network or is authorized to send and receive data through a network but is coupled to a rogue device.

In a specific implementation, the rogue client device 108 includes a station and is coupled to the rogue AP 106 through a wireless connection. A station, as used in this paper, can be referred to as a device with a media access control (MAC) address and a physical layer (PHY) interface to a wireless medium that complies with the IEEE 802.11 standard. Thus, for example, the network devices 106 and 108 can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, in which the rogue client device 108 is coupled to the network device 106 through a wireless connection, applicable devices, systems and engines described in this paper, may or may not be IEEE 802 standards compatible or IEEE 802 standards-compliant. As used in this paper, IEEE 802 standards-compatible or IEEE 802 standards-compliant complies with at least some of one or more of the incorporated documents' requirements and/or recommendations, or requirements and/or recommendations from earlier drafts of the documents, and includes Wi-Fi systems.

In a specific implementation, the detector access point 110 functions to detect a rogue device. A rogue device detected by the detector access point 110 can be either a rogue AP or a rogue client device. The detector access point 110 can detect a rogue device according to an applicable technique for detecting a rogue device. For example, the detector access point 110 can detect a rogue device if the rogue device does not conform with standards specific to devices coupled to a network. In another example, the detector access point 110 can detect a rogue device if unusual amounts of data are transmitted to the rogue device when compared to amounts of data transmitted to other devices in the network, or data is transmitted to the rogue device in unusual patterns when compared to patterns by which data is transmitted to other devices in the network. Depending upon implementation-specific or other considerations, the detector access point 110 can form part of a mesh network with a rogue AP that it detects as a rogue device.

In a specific implementation, the network backhaul rogue device management system 112 functions to manage detected rogue devices using a backhaul of a network. In managing rogue devices, the network backhaul rogue device management system 112 can receive a detected rogue device message from the detector access point that identifies a detected rogue device. Further in managing rogue devices, the network backhaul rogue device management system 112 can generate a rogue device message to the switches 104 that includes an identification of a detected rogue device. In a specific implementation, the rogue device message is a rogue device multicast (or broadcast) message. In an alternative implementation, the rogue device message is a rogue device unicast message. In yet another alternative, the rogue device message includes a plurality of unicast or multicast messages sent for the purpose of accomplishing one or more of the goals described in this paper.

In a specific implementation, the network backhaul rogue device management system 112 can receive messages from the switches 104 when switches detect a rogue device identified in a rogue device message. Depending upon implementation-specific or other considerations, the network backhaul rogue device management system 112 can receive a rogue new learned MAC message that includes new learned device data if a newly learned MAC address in a forwarding table of a switch matches an identification of a rogue device included in a rogue device message. Further depending upon implementation-specific or other considerations, the network backhaul rogue device management system 112 can receive a rogue aged MAC message that includes aged device data if a MAC address aged out of a forwarding table of a switch matches an identification of a rogue device included in a rogue device message. In various implementations, the network backhaul rogue device management system 112 can use new learned device data included in a rogue new learned MAC message and aged device data included in a rogue aged MAC message, to determine if a rogue device is In-Net or Out-Of-Net.

In a specific implementation, the network backhaul rogue device management system 112 can perform mitigation of a rogue device through a backhaul of a network. In performing mitigation of a rogue device, the network backhaul rogue device management system 112 can determine an action for mitigation of a rogue device. For example the network backhaul rogue device management system 112 can determine to add a rogue device to unauthorized list. In another example, the network backhaul rogue device management system 112 can determined to block all traffic on a port of a switch that a rogue device is coupled to the switch through. The network backhaul rogue device management system 112 can generate and send an unauthorized list mitigation message or a block port mitigation message based on a determined action for mitigation of a rogue device. Switches can perform mitigation of a rogue device using an unauthorized list mitigation message and a block port mitigation message received from the network backhaul rogue device management system 112.

Figure 2:
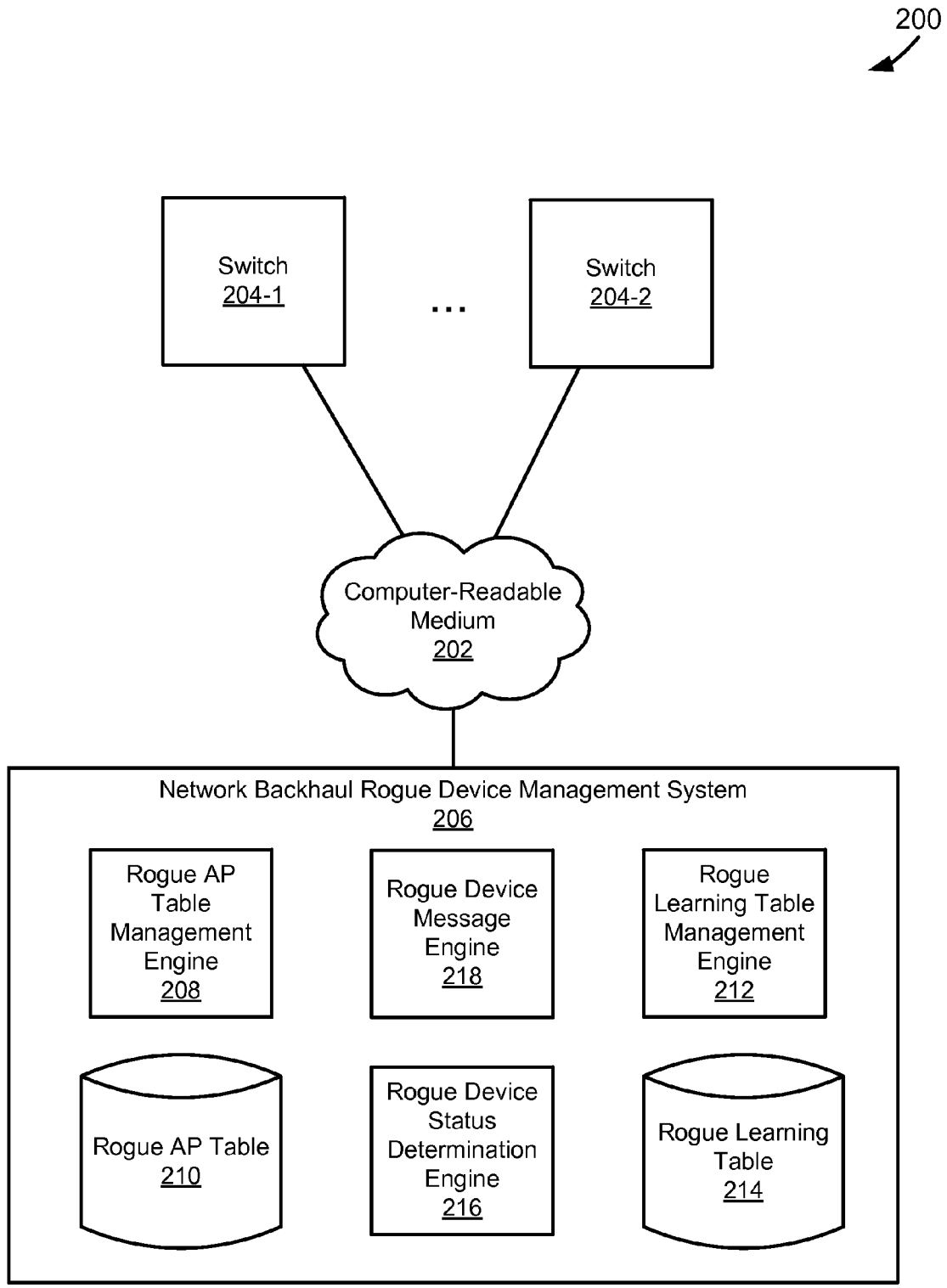
FIG. 2 depicts a diagram of an example of a system for managing rogue devices through a backhaul of a network.

FIG. 2 depicts a diagram 200 of an example of a system for managing rogue devices through a backhaul of a network. The example system shown in FIG. 2, includes a computer-readable medium 202, switches 204-1 and 204-2, hereinafter collectively referred to as "switches 204," and a network backhaul rogue device management system 206. The switches 204 and the network backhaul rogue device management system 206 are coupled to each other through the computer-readable medium.

The switches 204 function according to applicable switches in a backhaul of a network for managing rogue devices, such as switches described in this paper, for managing a rouge device through a backhaul of a network. In a specific implementation, the switches function to send aged MAC address messages and new learned MAC address messages.

The network backhaul rogue device management system 206 functions according to an applicable system for managing rogue devices through a backhaul of a network, such as the network backhaul rogue device management systems described in this paper. The network backhaul rogue device management system 206 can function to manage rogue APs associated with new learned device data received as part of a rogue learned MAC message received from the switches 204. In managing rogue APs associated with new learned device data received as part of a rogue learned MAC message received from the switches 204, In managing rogue APs associated with new learned device data received as part of a rogue learned MAC message, the network backhaul rogue device management system 206 can determine a rogue AP associated with the new learned device data. The network backhaul rogue device management system can determine a rogue AP associated with the learned device from new learned device data included in a learned MAC message or from learned device data included in a new learned device data include in a learned aged MAC message and a rogue AP table or a rogue learning table.

In a specific implementations, the network backhaul rogue device management system 206 functions to update a status of a rogue AP determined as In-Net. In updating a status of a rogue AP as In-Net, the network backhaul rogue device management system 206 can receive a rogue leaned MAC message that includes new learned device data from switches in a backhaul of a network.

In a specific implementation, the network backhaul rogue device management system 206 functions to perform mitigation of a rogue AP that is determined to be In-Net. In performing mitigation of a rogue AP that is determined to be In-Net, the network backhaul rogue device management system 206 can function to send a mitigation message that is used in performing mitigation of a rogue device.

In a specific implementation, the network backhaul rogue device management system 206 functions to receive a rogue aged MAC message that includes aged device data. Aged device data included in a rogue aged MAC message received by the network backhaul rogue device management system 206 can include a MAC address of a rogue device that is aged out of a forward learning tale and a VLAN ID of a rogue device with a MAC address that is aged out a forwarding table. In a specific implementation, the network backhaul rogue device management system 206 functions to determine a rogue AP associated with aged device data included in a rogue aged MAC message.

In a specific implementation, the network backhaul rogue device management system 206 functions to update a status of a rogue AP associated with a rogue device that is aged out of a forward learning table as Out-Of-Net. In a specific implementation, the network backhaul rogue device management system 206 functions to update a status of a rogue AP associated with a rogue device that is aged out of a forward learning table as In-Net if other devices associated with the rogue AP are newly learned by forwarding tables, and therefore in the rogue learning table. In a specific implementation, the network backhaul rogue device management system 206 functions to perform mitigation, at least in part of a rogue AP associated with a rogue device that is aged out of a forward learning table. In performing mitigation of a rogue AP associated with a rogue device that is aged out of a forward learning table, the network backhaul rogue device management system 206 can function to send a mitigation message that is used in performing mitigation of a rogue device.

In the example system shown in FIG. 2, the network backhaul rogue device management system 206 includes a rogue AP table management engine 208, a rogue AP table datastore 210, a rogue learning table management engine 212, a rogue learning table datastore 214, a rogue device status determination engine 216, and a rogue device message engine. In a specific implementation, the rogue AP table management engine 208 functions to manage a rogue AP table stored in the rogue AP table datastore 210. A rogue AP table stored in the rogue AP table datastore 210 can include an identification, e.g. a MAC address, of a rogue AP and an identification, e.g. a MAC address, of rogue client devices that are coupled to the rogue AP.

In a specific implementation, the rogue AP table management engine 208 functions to determine whether a rogue device detected by an applicable system or device for detecting a rogue device, is in a rogue AP table. The rogue AP table management engine 208 can determined whether a rogue device is in a rogue AP table after receiving a detected rogue device message that includes an identification of the rogue device, e.g. a MAC address of the rogue device. In determining whether a rogue device is in a rogue AP table, the AP table management engine 208 can determine whether the rogue AP table has an entry that includes an identification of the rogue device.

In a specific implementation, the rogue AP table management engine 208 functions to add a MAC address of a rogue device to a rogue AP table. In adding a MAC address of a rogue device to a rogue AP table, the rogue AP table management engine 208 can create an entry in a rogue AP table that includes the MAC address of the rogue device. The rogue AP table management engine 208 can add a MAC address of a rogue device into a rogue AP table, if it determines that the rogue device is not in the rogue AP table.

In a specific implementation, the rogue AP table management engine 208 functions to determine rogue client devices associated with a rogue AP. In determining rogue client devices associated with a rogue AP, the rogue AP table management engine 208 can look up a MAC address of a rogue AP in a rogue AP table, to determine if rogue client devices are included in entries with the rogue AP. The rogue AP table management engine 208 can determine rogue client devices associated with a rogue AP, after it is determined that a rogue AP is a valid device. The rogue AP table management engine 208 can also determine a rogue client device associated with a rogue AP, after it is determined that the rogue AP is Out-Of-Net.

In a specific implementation, the rogue AP table management engine 208 functions to remove entries of a rogue AP and rogue client devices associated with the rogue AP from a rogue AP table. The rogue AP table management engine 208 can remove entries of a rogue AP and rogue client devices associated with the rogue AP from a rogue AP table after it is determined that the rogue AP is a valid device. The rogue AP table management engine 208 can remove entries of a rogue AP and rogue client devices associated with the rogue AP from a rogue AP table after it is determined that the rogue AP is Out-Of-Net.

In a specific implementation, the rogue AP table management engine 208 functions to remove entries of a rogue client device from a rogue AP table. The rogue AP table management engine 208 can remove entries of a rogue client device from a rogue AP table, if it is determined that the rogue client device is a valid device. The rogue AP table management engine 208 can remove entries of a rogue client device from a rogue AP table, if it is determined that the rogue client device is Out-Of-Net.

In a specific implementation the rogue learning table management engine 212 functions to manage a rogue learning table stored in the rogue learning table datastore 214. A rogue learning table stored in the rogue learning table datastore 214 can include a MAC address, including a learned MAC address, of a rogue device, including both rogue APs and rogue client devices. A rogue learning table stored in the rogue learning table datastore 214 can also include a VLAN ID of a rogue device, and a MAC address of a nearest switch to a rogue device.

In a specific implementation, the rogue learning table management engine 212 functions to determine whether an entry in a rogue learning table matches new learned device data included in a rogue learned MAC message. In determining whether an entry in a rogue learning table matches new learned device data, the rogue learning table management engine 212 can determine whether an identification of a rogue device, e.g. a MAC address of the rogue device, included as part of new learned device data in a rogue learned MAC message, is in an entry in the rogue learning table.

In a specific implementation, the rogue learning table management engine 212 functions to add new learned device data included in a rogue learned MAC message to a rogue learning table. For example, the rogue learning table management engine 212 can add a learned MAC address of a rogue device, a VLAN ID of the rogue device, and a MAC address of a nearest switch or switches to the rogue device to a rogue learning table. The rogue learning table management engine 212 can add new learned device data included in a rogue learned MAC message to a rogue learning table if it is determined that no entries in the rogue learning table match the new learned device data.

In a specific implementation, the rogue learning table management engine 212 functions to determine whether an entry in a rogue learning table matches aged device data included in a rogue aged MAC message. In determining whether an entry in a rogue learning table matches aged device data, the rogue learning table management engine 212 can determine whether an identification of a rogue device, e.g. a MAC address of the rogue device, included as part of aged device data in a rogue aged MAC message, is in an entry in the rogue learning table.

In a specific implementation, the rogue learning table management engine 212 functions to remove entries that are matched to aged device data included in a rogue aged MAC message from a rogue learning table. For example if an entry in a rogue learning table includes a MAC address of a rogue device, included as aged device data in a rogue aged MAC message, then the rogue learning table management engine 212 can remove entries in the rogue learning table that include the MAC address of the rogue device.

In a specific implementation, the rogue learning table management engine 212 functions to remove entries of a rogue AP and rogue client devices associated with the rogue AP from a rogue learning table. The rogue learning table management engine 212 can remove entries of a rogue AP and rogue client devices associated with the rogue AP from a rogue learning table after it is determined that the rogue AP is a valid device.

The rogue learning table management engine 212 can remove entries of a rogue AP and rogue client devices associated with the rogue AP from a rogue learning table after it is determined that the rogue AP is Out-Of-Net.

In a specific implementation, the rogue learning table management engine 212 functions to remove entries of a rogue client device from a rogue learning table. The rogue learning table management engine 212 can remove entries of a rogue client device from a rogue learning table, if it is determined that the rogue client device is a valid device. The rogue learning table management engine 212 can remove entries of a rogue client device from a rogue learning table, if it is determined that the rogue client device is Out-Of-Net.

In a specific implementation, the rogue device status determination engine 216 functions to determine a status of a rogue device. Depending upon implementation-specific or other considerations, the rogue device status determination engine 216 can determine a status of a rogue device that is either a rogue AP or a rogue client device. In determining status of a rogue device, the rogue device status determination engine 216 can determine that the rogue device is Out-Of-Net. For example, the rogue device status determination engine 216 can determine that a rogue device is Out-Of-Net if a status of the rogue device is updated to Out-Of-Net. A status of a rogue device can be updated to Out-Of-Net, if the rogue device is the subject of aged device data included in a rogue aged MAC message, and it is determined that other new learned rogue devices are not associated with the rogue device. Similarly the rogue device status determination engine 216 can determine that a rogue device is In-Net if the status of the rogue device does not change from In-Net or is changed to In-Net. A status of a rogue device can be In-Net, if the rogue device is the subject of aged device data included in a rogue aged MAC message, and it is determined that other new learned rogue devices are associated with the rogue device. In determining status of a rogue device, the rogue device status determination engine 216 can determine that the rogue device is a valid device. The rogue device status determination engine 216 can determine that a rogue device is a valid device if either or both input is received from a network administrator indicating that the rogue device is a valid device, or if it determines that the rogue device conforms with network policies for a network.

In a specific implementation, the rogue device message engine 218 functions to generate and send messages used in managing rogue devices through a backhaul of a network. The rogue device message engine 218 can generate and send a rogue device message. A rogue device message generated and sent by the rogue device message engine 218 can include an identification, e.g. a MAC address, of a rogue device detected by an applicable system or device, such as a detector access point described in this paper. The rogue device message engine 218 can send a rogue device message to switches 204 in a backhaul of a network.

In a specific implementation, the rogue device message engine 218 can generate and send a rogue update message. A rogue update message generated and sent by the rogue device message engine 218 can include rogue removal data. Rogue removal data included in a rogue update message can list an identification, e.g. a MAC address, of rogue devices that are either valid network devices or are determined to be Out-Of-Net. Rogue removal data included in a rogue update message can include a list of rogue APs and rogue client devices coupled to the rogue AP that are determined to be valid network devices or are determined to be Out-Of-Net.

Figure 3:
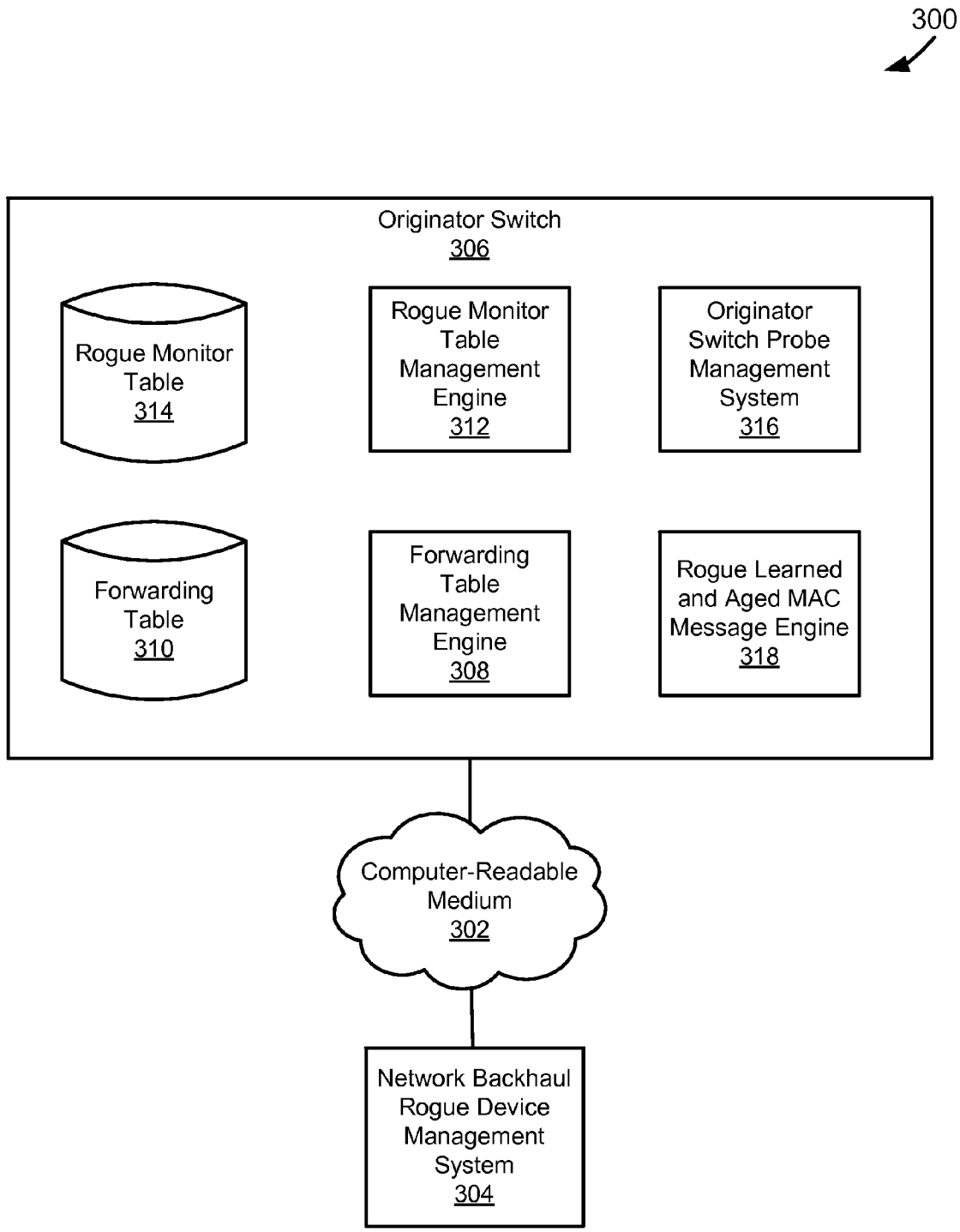
FIG. 3 depicts a diagram of an example of a system for managing rogue devices using an originator switch in a backhaul of a network.

FIG. 3 depicts a diagram 300 of an example of a system for managing rogue devices using an originator switch in a backhaul of a network. The example system shown in FIG. 3 includes a computer-readable medium 302, a network backhaul rogue device management system 304, and an originator switch 306. In the example system shown in FIG. 3, the network backhaul rogue device management system 304 and the originator switch 306 are coupled to each other through the computer-readable medium 302.

In a specific implementation, the network backhaul rogue device management system 304 functions according to an applicable system for managing rogue devices in a network through a backhaul of the network, such as network backhaul rogue device management systems described in this paper. In managing rogue devices in a network, the network backhaul rogue device management system 304 can send rogue device messages that include an identification of a detected rogue device in a network. Further in managing rogue devices in a network, the network backhaul rogue device management system 304 can send rogue update messages that include rogue removal data. Rogue removal data included in rogue update messages can include an identification of rogue devices that are either determined to be valid devices or are determined to be Out-Of-Net.

In a specific implementation, the originator switch functions according to an applicable switch in a backhaul of a network used in managing rogue devices in the network, such as the switches described in this paper. An originator switch, as used in this paper, is a switch in a backhaul of a network that newly learns a MAC address of a rogue device, or ages a MAC address of a rogue device out of a forwarding table of the switch. The originator switch functions to receive messages from the network backhaul rogue device management system that are used in managing rogue devices in a network. For example, the originator switch can receive rogue device messages, and rogue update messages.

In the example system shown in FIG. 3, the originator switch 306, includes a forwarding table management engine 308, a forwarding table datastore 310, a rogue monitor table management engine 312, a rogue monitor table datastore 314, an originator switch probe management system 316, and a rogue learned and aged MAC message engine 318. In a specific implementation, the forwarding table management engine 308 functions to manage a forwarding table for the originator switch stored in the forwarding table datastore 310. In managing a forwarding table, the forwarding table management engine 308 can add and delete entries from a forwarding table that include MAC addresses of devices, including rogue devices, in a network.

In a specific implementation, the forwarding table management engine 308 functions to flush entries from a forwarding table in response to a rogue device message received from the network backhaul rogue device management system 304. For example, if a rogue device message includes an identification of a rogue device, e.g. a MAC address of the rogue device, then the forwarding table management engine 308 can remove entries in the forwarding table that include the identification of the rogue device.

In a specific implementation, the forwarding table management engine 308 functions to remove entries from a forwarding table in response to a rogue update message received from the network backhaul rogue device management system 304. For example if rogue removal data included in a rogue update message specifies identifications of rogue devices that are either determined to be valid devices or are determined to no longer be In-Net, i.e. are Out-Of-Net, then the forwarding table management engine 308 can remove entries in a forwarding table that contain identification of the rogue devices included in the rogue removal data.

In a specific implementation, the rogue monitor table management engine 312 functions to manage a rogue monitor table. The rogue monitor table management engine 312 can monitor a rogue monitor table that is stored in the rogue monitor table datastore 314. Depending upon implementation-specific or other considerations, the rogue monitor table management engine 312 and the rogue monitor table datastore 314 can be implemented as a corresponding cloud-based engine and cloud-based datastore. A rogue monitor table managed by the rogue monitor table management engine 312 and stored in the rogue monitor table datastore 314, can include entries that include an identification of a rogue device, e.g. a rogue device MAC address, a mask that is used for the rogue device, and a learned status field indicating whether the rogue device remains learned in a forwarding table of the switches. In managing a rogue monitor table, the rogue monitor table management engine 312 can add and delete entries from a rogue monitor table stored in the rogue monitor table datastore 314.

In a specific implementation, the rogue monitor table management engine 312 functions to add entries into a rogue monitor table in response to a rogue device message received from the network backhaul rogue device management system 304. For example, if a rogue device message includes an identification of a rogue device, e.g. a MAC address of the rogue device, then the rogue monitor table management engine 312 can add entries in a rogue monitor table that include the identification of the rogue device.

In a specific implementation, the rogue monitor table management engine 312 functions to remove entries from a rogue monitor table in response to a rogue update message received from the network backhaul rogue device management system 304. For example if rogue removal data included in a rogue update message specifies identifications of rogue devices that are either determined to be valid devices or are determined to no longer be In-Net, i.e. are Out-Of-Net, then the rogue monitor table management engine 312 can remove entries in a rogue monitor table that contain identification of the rogue devices included in the rogue removal data.

In a specific implementation, the forwarding table management engine 308 functions to monitor learned and aged MAC addresses in a forwarding table stored in the forwarding table datastore 310. In monitoring learned and aged MAC addresses in a forwarding table can use a rogue monitor table stored in the rogue monitor table datastore 314. Specifically, the forwarding table management engine 308 can determine whether a new learned MAC address or a MAC address aged out of a forwarding table are included in a rogue monitor table.

In a specific implementation, the originator switch probe management system 316 functions to initiate a probe procedure to determine one or a plurality of nearest switches to a rogue device with a MAC address that is newly learned in a forwarding table and is in a rogue monitor table, as determined by the forwarding table management engine 308. In initiating a probe procedure to determine a nearest switch to a rogue device, the originator switch probe management system 316 can generate a probe message that includes an initial hop number. Further in initiating a probe procedure, the originator switch probe management system 316 can send a probe message with an initial hop number to one or a plurality of next switches in a backhaul of a network. For example, the originator switch probe management system 316 can send a probe message to a plurality of next switches that form different branches in a backhaul of a network.

In a specific implementation, the rogue learned and aged MAC message engine 318 functions to generate and send a rogue aged MAC message to the network backhaul rogue device management system 304. The rogue learned and aged MAC message engine 318 can generate a rogue aged MAC message if the forwarding table management engine 308 determines that a MAC address aged out of a forwarding table is in a rogue monitor table. A rogue aged MAC message generated by the rogue learned and aged MAC message engine 318 can include aged device data. Aged device data included in an aged MAC message can include the aged MAC address. Aged device data can also include a VLAN ID of a rogue device that has the aged MAC address or a switch with a corresponding forwarding table from which the MAC address is aged. New learned device data included in a new learned MAC message can include the new learned MAC address. New learned device data can also include a VLAN ID of a rogue device that has the new learned MAC address or a switch with a corresponding forwarding table from which the MAC address is aged. Additionally, new learned device data can also include one or a plurality of nearest switches to a rogue device with the new learned MAC address determined by the forwarding table management engine 308 to be in a rogue monitor table.

In a specific implementation, the rogue learned and aged MAC message engine 318 functions to generate and send a rogue learned MAC message to the network backhaul rogue device management system 304. The rogue learned and aged MAC message engine 318 can generate a rogue learned MAC message if the forwarding table management engine 308 determines that a MAC address newly learned in a forwarding table is in a rogue monitor table. A rogue learned MAC message generated by the rogue learned and aged MAC message engine 318 can include new learned device data. Aged device data included in an aged MAC message can include the aged MAC address. Aged device data can also include a VLAN ID of a rogue device that has the aged MAC address or a switch with a corresponding forwarding table from which the MAC address is aged.

Figure 4:
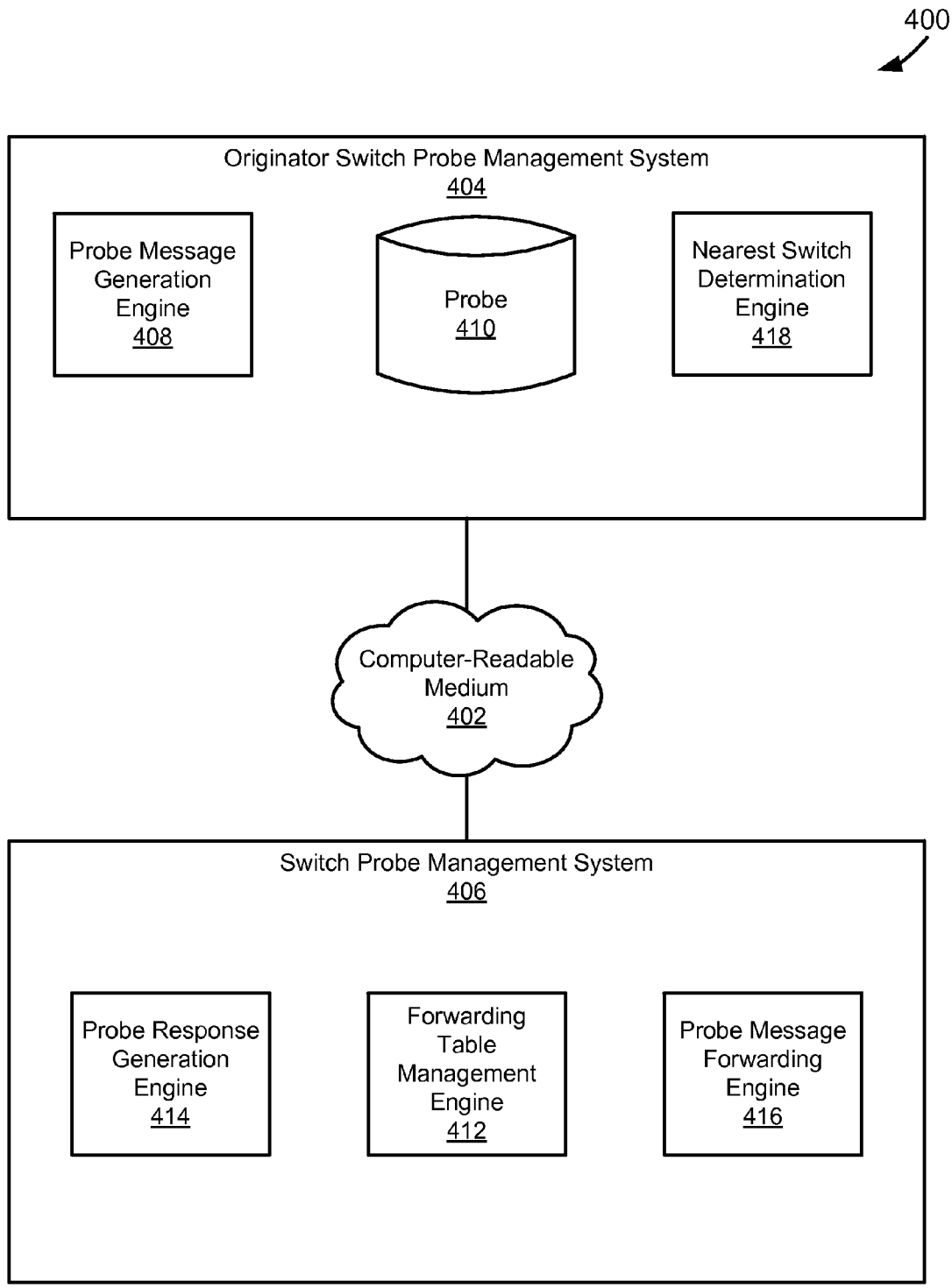
FIG. 4 depicts a diagram of an example of a system for determining a nearest switch to a rogue device.

FIG. 4 depicts a diagram 400 of an example of a system for determining a nearest switch to a rogue device. The example system shown in FIG. 4, includes a computer-readable medium 402, an originator switch probe management system 404, and a switch probe management system 406. In the example system shown in FIG. 4, the originator switch probe management system 404 and the switch probe management system are coupled to each other through the computer-readable medium 402.

In a specific implementation, the originator switch probe management system 404 functions according to an applicable system for determining a nearest switch to a rogue device. The originator switch probe management system 404 can be implanted on an originator switch. In determining a nearest switch to a rogue device, the originator switch probe management system can generate and send a probe message with an initial hop number to the switch probe management system 406.

In a specific implementation, the switch probe management system 406 functions to generate a probe response to a received probe message. The switch probe management system 406 also functions to forward a received probe message to a next switch in a backhaul of a network.

In the example system shown in FIG. 4, the originator switch probe management system 404 includes a probe message generation engine 408 and a probe datastore 410. In a specific implementation the probe message generation engine 408 functions to generate and send a probe message. The probe message generation engine 406 can generate and send a probe message after it is determined at an originator switch that a new learned MAC address in a forwarding table of the originator switch is in a rogue monitor table. A probe message generated by the probe message generation engine 408 can include a new learned MAC address that is determined to be in a rogue monitor table. A probe message generated by the probe message generation engine 408 can also include an initial hop number.

The probe datastore 410 functions to store probe data. Probe data stored in the probe datastore 410 can include an initial hop number that is sent with a probe message that is sent by the probe message generation engine.

In the example system shown in FIG. 4, the switch probe management system 406 includes a forwarding table management engine 414, a probe response generation engine 414, and a probe message forwarding engine 416. In a specific implementation, the forwarding table management engine 414 functions according to an applicable engine for managing a forwarding table of a switch, such as a forwarding table management engine described in this paper. The forwarding table management engine 414 can determine whether a new learned MAC address included in a probe message received from the originator switch probe management system is included in a forwarding table of a switch of which the switch probe management system is associated.

In a specific implementation, the probe response generation engine 414 functions to generate and send a probe response back to the originator switch probe management system 404. The probe response generation engine 414 can generate and send a probe response if it is determined by the forwarding table management engine 412 that a new learned MAC address included in the probe message is in a forwarding table at the switch, as determined by the switch probe management system 406. A probe response generated by the probe response generation engine can include an increased hop number that the probe response generation engine increases and an identification of a switch associated with the switch probe management system 406. A probe response generated by the probe response generation engine 412 and sent to the originator switch probe management system 404 can be stored as probe data in the probe datastore 410.

In a specific implementation, the probe response generation engine 414 functions to increase a hop number in a probe response. The probe response generation engine 414 can increase a hop number in a probe response if it is determined by the forwarding table management engine 412 that a new learned MAC address included in the probe message is in a forwarding table at the switch, as determined by the switch probe management system 406.

In a specific implementation, the probe message forwarding engine 416 functions to forward a probe message to a next switch. The probe message forwarding engine 416 can forward a probe message to a next switch as a layer 2 package. Depending upon implementation-specific or other considerations, the probe message forwarding engine 416 can forward a probe message that includes an increased hop number increased by the probe response generation engine 414. Further depending upon implementation-specific or other considerations, the probe message forwarding engine 416 can forward a probe message that does not include a hop number that has been increased by the probe response generation engine 414.

In a specific implementation, the nearest switch determination engine 418 determines a nearest switch based on whether probe responses are received and probe responses that are received. In determining a nearest switch to a rogue device, the nearest switch determination engine 418 determines if any probe responses are received and included as probe data stored in the probe datastore 410. If it is determined that no probe responses are received, then the nearest switch determination engine 418 can determine that an originator switch is the nearest switch. Further depending upon implementation-specific or other considerations, if probe responses are received, the nearest switch determination engine 418 can determine that a switch that sent a probe response with the highest increased hop number is a nearest switch to a rogue device.

Figure 5:
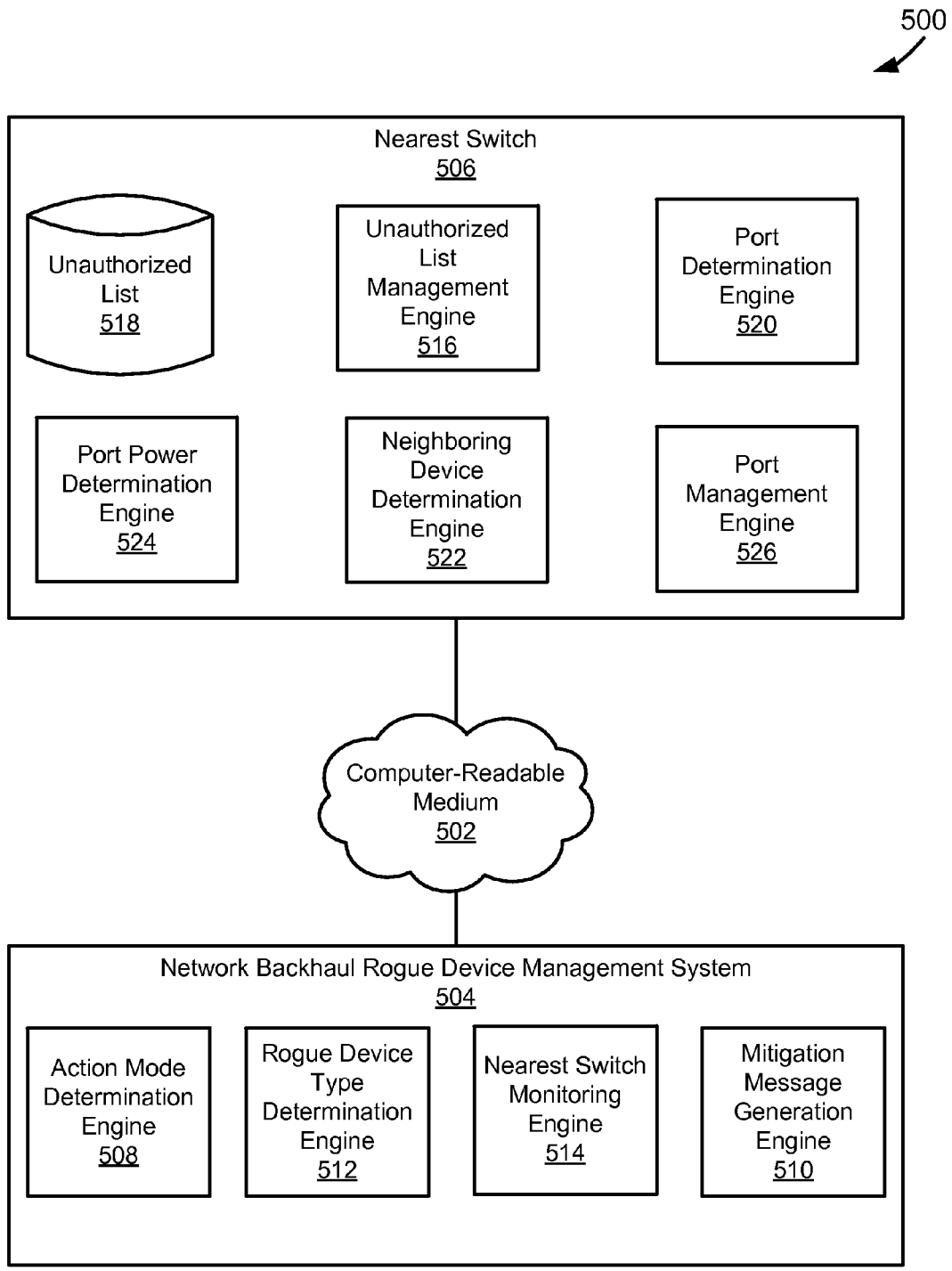
FIG. 5 depicts a diagram of an example of a system for managing mitigation of a rogue device through a backhaul of a network.

FIG. 5 depicts a diagram 500 of an example of a system for managing mitigation of a rogue device through a backhaul of a network. The example system shown in FIG. 5 includes a computer-readable medium 502, a network backhaul rogue device management system 504, and a nearest switch 506. In the example system shown in FIG. 5, the network backhaul rogue device management system 504 and the nearest switch 506 are coupled to each other through the computer-readable medium 502.

In a specific implementation, the network backhaul rogue device management system 504 can function according to an applicable system for managing rogue devices through a backhaul of a network, such as the network backhaul rogue device management systems described in this paper. In managing rogue devices in a network, the network backhaul rogue device management system 504 can send rogue device messages that include an identification of a detected rogue device in a network. Further in managing rogue devices in a network, the network backhaul rogue device management system 504 can send rogue update messages that include rogue removal data. Rogue removal data included in rogue update messages can include an identification of rogue devices that are either determined to be valid devices or are determined to be Out-Of-Net.

In a specific implementation, the nearest switch 506 functions according to an applicable switch for managing rogue devices through a backhaul of a network. The nearest switch 506 can be a nearest switch or one of a plurality of nearest switches to a rogue device on which mitigation is performed.

In the example system shown in FIG. 5, the network backhaul rogue device management system 504 includes an action mode determination engine 508, a mitigation message generation engine 510, a rogue device type determination engine 512, and a nearest switch monitoring engine 514. In a specific implementation, the action mode determination engine 508 functions to determine an action mode for mitigation of a rogue device. The action mode determination engine 508 can determine an action mode for mitigation of a rogue device from policies of a network. For example, if network policies specify to add a rogue device to an unauthorized list, then the action mode determination engine 508 can determine that an action mode for mitigation is adding the rogue device to the unauthorized list. The action mode determination engine 508 can also determine an action mode for mitigation of a rogue device can by querying a network administrator for a specific action mode.

In a specific implementation, the mitigation message generation engine 510 can generate and send a mitigation message to the nearest switch. Depending upon implementation-specific or other considerations, a mitigation message generated and sent by the mitigation message generation engine 510 can be an unauthorized list mitigation message. The mitigation message generation engine 510 can generate and send an unauthorized list mitigation message to the nearest switch 506 if the action mode determination engine 508 determines that an action mode is to add a rogue device to an unauthorized list. An unauthorized list mitigation message generated and sent by the mitigation message generation engine 510 can identify that the determined action mode for mitigation of the rogue device is adding the rogue device to the unauthorized list. A mitigation message generated and sent by the mitigation message generation engine 510 can also include a MAC address of a rogue device, a BSS ID of the rogue device, and a VLAN ID of the rogue device. Further depending upon implementation-specific or other considerations, a mitigation message generated and sent by the mitigation message generation engine 510 can be a block port mitigation message. A block port mitigation message generated and sent by the mitigation message generation engine 510 can identify that the determined action mode for mitigation of the rogue device is to block the port through which the rogue device is coupled to the nearest switch. A block portion mitigation message generated and sent by the mitigation message generation engine 510 can also include a MAC address of a rogue device, a BSS ID of the rogue device, and a VLAN ID of the rogue device.

In a specific implementation, the rogue device type determination engine 512 functions to determine a device type of a rogue device. In determining a device type of a rogue device, the device type determination engine 512 can determine whether a rogue device is a rogue AP or a rogue client device. The rogue device type determination engine 512 can determine whether a rogue device is a rogue client or a rogue AP by looking up the MAC address of the rogue device in a rogue AP table. For example, if the MAC address of a rogue device in the rogue AP table indicates that there are devices that are connected to the rogue device, then it can be determined that the rogue device is a rogue AP. If the action mode determination engine 508 determines that an action mode for mitigation of a rogue device is to block traffic on a port that the rogue device is coupled to, and it is determined by the rogue device type determination engine 512 that the rogue device is a client device, then the mitigation message generation engine 510 can generate and send an unauthorized list mitigation message for the rogue device to the nearest switch 506.

In a specific implementation, the nearest switch monitoring engine 514 functions to determine if there are multiple nearest switches to a rogue device. The nearest switch monitoring engine 514 can determine if there are multiple nearest switches to a rogue device from probe data that indicates the identifications of nearest switches to a rogue device. If the action mode determination engine 508 determines that an action mode for mitigation is to block a port of a switch to which a rogue device is coupled and the nearest switch monitoring engine 514 determines that there are multiple nearest switches to the rogue device, then the mitigation message generation engine 510. If the action mode determination engine 508 determines that an action mode for mitigation is to block a port of a switch to which a rogue device is coupled, the rogue device type determination engine 512 determines that the rogue device is a rogue AP, and the nearest switch monitoring engine 514 determines that there are not multiple nearest switches to the rogue device, then the mitigation message generation engine 510 can generate and send a block port mitigation message to the nearest switch 506.

In the example system shown in FIG. 5, the nearest switch 506 includes an unauthorized list management engine 516, an unauthorized list datastore 518, a port determination engine 520, a neighboring device determination engine 522, a port power determination engine 524, and a port management engine 526. In a specific implementation, the unauthorized list management engine 516 functions to manage an unauthorized list stored in the unauthorized list datastore 516. The unauthorized list management engine 516 and the unauthorized list datastore 516 can be implemented as a corresponding cloud-based engine and a cloud-based datastore. The unauthorized list management engine 516 can add an identification of a rogue device, e.g. a MAC address of the rogue device, to an unauthorized list stored in the unauthorized list datastore if an unauthorized list mitigation message for the rogue device is received from the network backhaul rogue device management system.

In a specific implementation, the port determination engine 520 functions to determine a port on the nearest switch 506 at which the rogue device is coupled to the switch. The port determination engine 520 can determine a port on the nearest switch 506 after a block port mitigation message is received at the nearest switch.

In a specific implementation, the neighboring device determination engine functions to determine a neighboring device that is coupled to a port of the nearest switch 506 determined by the port determination engine 520. Depending upon implementation-specific or other considerations, the neighboring device determination engine 522 can determine that a switch is a neighboring device. If a block port mitigation message for a rogue device is received and the neighboring device determination engine determines that a neighboring device is a switch, then the unauthorized list management engine 516 can add the MAC address of the rogue device to an unauthorized list stored in the unauthorized list datastore 518. Further depending upon implementation-specific or other considerations, the neighboring device determination engine 522 can determine that a rogue device is a neighboring device.

In a specific implementation, the port power determination engine 524 determines whether a port determined by the port determination engine 520 is supplying power. The port power determination engine 524 can use an applicable mechanism for determining power, to determine whether a port determined by the port determination engine 520 is supplying power. If a block port mitigation message for a rogue device is received and the port power determination engine 524 determines that a port on the nearest switch associated with the rogue device is not supplying power, then the unauthorized list management engine 516 can add the MAC address of the rogue device to an unauthorized list stored in the unauthorized list datastore 518.

In a specific implementation, the port management engine 526 functions to block traffic on a port determined by the port determination engine 520. The port management engine can block all traffic on a port if a block port mitigation message for a rogue device is received, a neighboring device on a port determined by the port determination engine 520, and it is determined that the port is supplying power, then the port management engine 526 can block all traffic on the port.

Figure 6A:
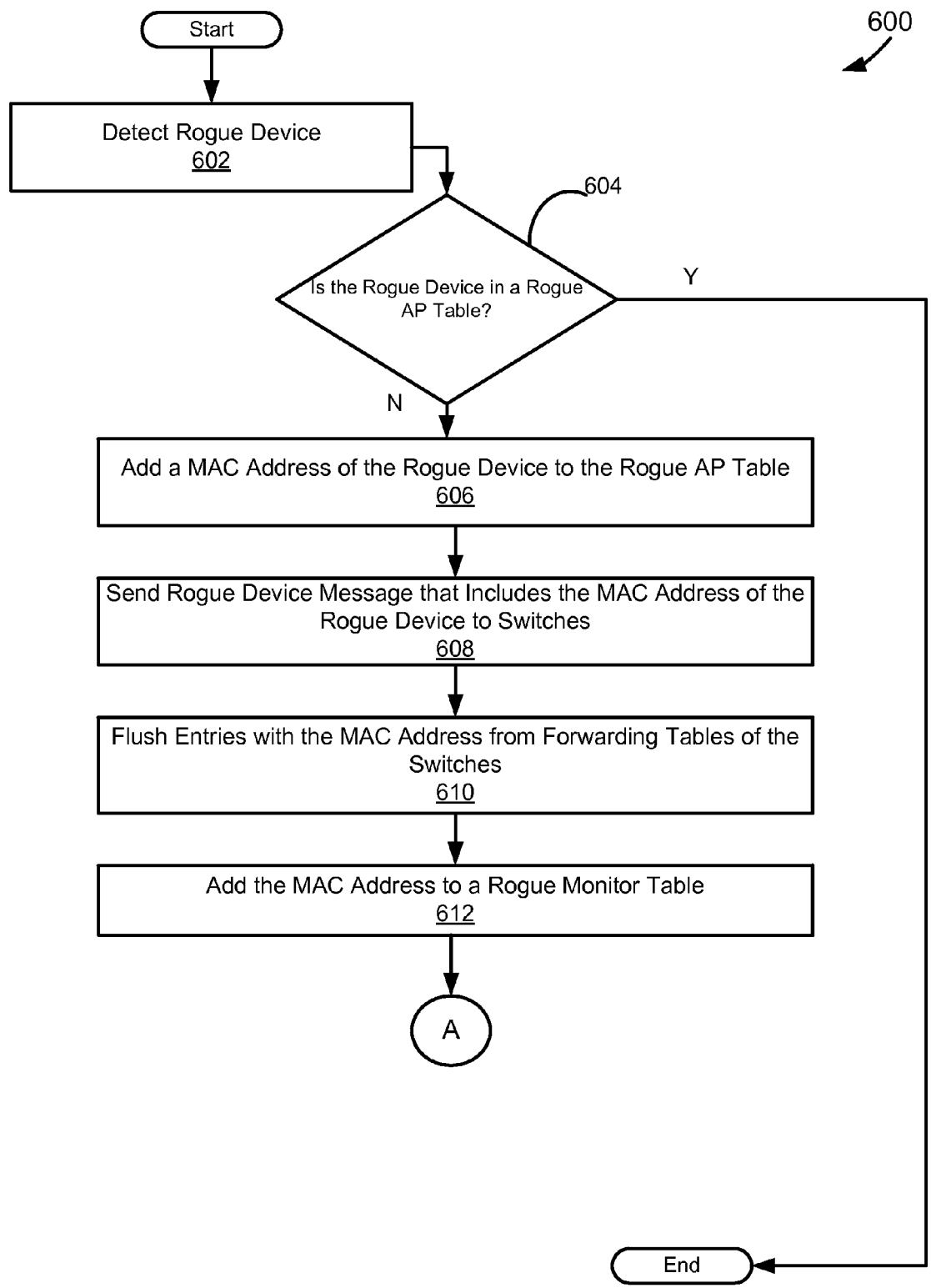
FIGS. 6A and 6B depict a flowchart of an example of a method for monitoring rogue devices in a network through a backhaul of the network.
Figure 6B:
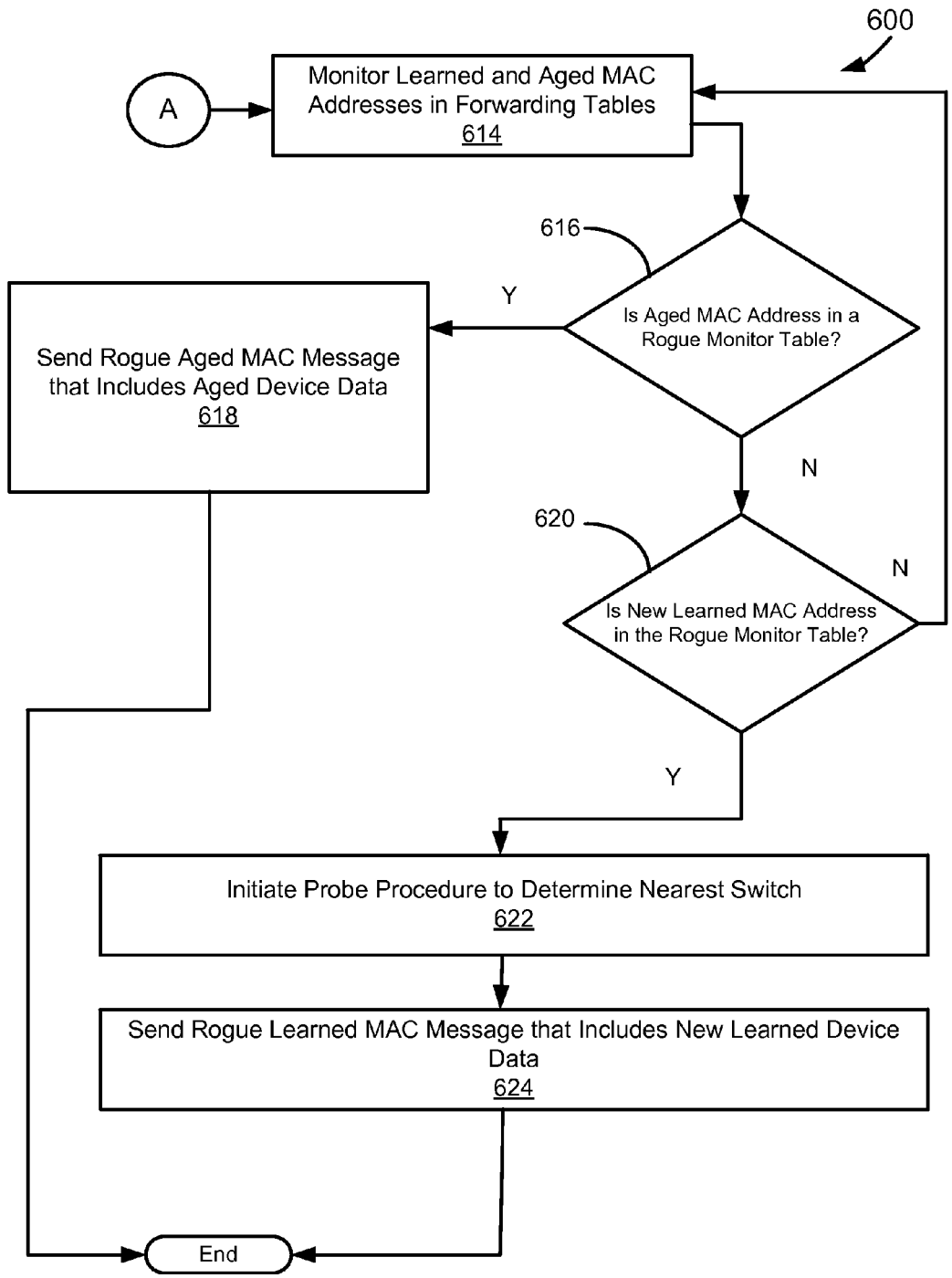

FIGS. 6A and 6B depict a flowchart 600 of an example of a method for monitoring rogue devices in a network through a backhaul of the network. The flowchart 600 begins at module 602 where a rogue device is detected. A rogue device detected at module 602 can be either a rogue AP or a rogue client device. A rogue device can be detected at module 602 by an applicable device for detecting a rogue device. Depending upon implementation-specific or other considerations, a detector that detects a rogue device at module 602 can be an AP that is part of a network, such as a detector access point described in this paper. Further depending upon implementation-specific or other considerations, an AP that detects a rogue device at module 602 can be part of a mesh network that includes the detected rogue device. A rogue device can be detected at module 602 according to an applicable technique for detecting a rogue device. For example, a rogue device can be detected at module 602 if it does not conform with standards specific to network devices coupled to a network. In another example, a rogue device can be detected at module 602 if unusual amounts of data are transmitted to the rogue device when compared to amounts of data transmitted to other devices in the network, or data is transmitted to the rogue device in unusual patterns when compared to patterns by which data is transmitted to other devices in the network.

The flowchart 600 continues to decision point 604, where it is determined whether the rogue device detected at module 602 is in a rogue AP table. An applicable system for managing a rogue AP table can determine whether the rogue device detected at module 602 is in the rogue AP table, such as a rogue AP table management engine as described in this paper. Depending upon implementation-specific or other considerations, a rogue AP table can be maintained as a cloud-based datastore, and a rogue AP table management engine can determine whether the rogue device detected at module 602 is in the rogue AP table. Further depending upon implementation-specific or other considerations, an applicable system or engine, such as a network backhaul rogue device management system or a rogue AP table management engine can determine whether the rogue device is in the rogue AP table in response to a detected rogue device message received from an applicable device for detecting a rogue device, such as a detector access point described in this paper. If it is determined at decision point 604 that the rogue device detected at module 602 is in a rogue AP table, then the flowchart 600 ends.

If it is determined at decision point 604 that the rogue device detected at module 602 is not in a rogue AP table, then the flowchart 600 continues to module 606. At module 606, a MAC address of the rogue device detected at module 602 is added to the rogue AP table. An applicable system for managing a rogue AP table can add a MAC address of the rogue device into the rogue AP table, such as a rogue AP table management engine described in this paper. Depending upon implementation-specific or other considerations, a MAC address of the rogue device that is added to the rogue AP table at module 606 can be included in a detected rogue device message received from an applicable device for detecting a rogue device, such as a detector access point described in this paper.

The flowchart 600 continues to module 608, where a rogue device message that includes the MAC address of the rogue device is generated and sent to switches. A rogue device message can be generated and sent to switches at module 608 by an applicable system for generating and sending a rogue device message, such as a rogue device message engine described in this paper. A rogue device message can be sent at module 608 to switches that form, at least part of, a backhaul of a network. Depending upon implementation-specific or other considerations, a rogue device message can be sent at module 608 to a subset of switches that form a backhaul of a network. For example, a rogue device message can be sent to a subset of switches that route traffic, are located around, or are otherwise associated with a detector that detects the rogue device at module 602.

The flowchart 600 continues to module 610, where entries that include the MAC address of the rogue device includes in the rogue device message sent at module 608 are removed from forwarding tables of the switches. Entries of the forwarding tables of the switches that include the MAC address in the rogue device message can be removed by an applicable engine for managing the forwarding tables of the switches, such as forwarding table management engines described in this paper. Depending upon implementation-specific or other considerations, a switch may or may not have to flush entries from a forwarding table that include the MAC address in the rogue device message, based on whether the switch has routed traffic to the rogue device with the MAC address.

The flowchart 600 continues to module 612, where the MAC address included in the rogue device message, is added to a rogue monitor table. An applicable system for managing a rogue monitor table, such as rogue monitor table management engines described in this paper, can add the MAC address included in the rogue device message to the rogue monitor table. Depending upon implementation, specific a rogue monitor table can be implemented on each switch in a backhaul of a network that receives the rogue device message, or implemented in a cloud-based datastore that is accessible by the switches to which the rogue device message are sent. Further depending upon-implementation specific or other considerations, when a rogue monitor table is implemented in a cloud-based datastore, a single applicable engine, such as a rogue monitor table management engine, associated with a particular switch can update the rogue monitor table by adding the MAC address into the rogue monitor table. In adding the MAC address to a rogue monitor table, an entry in the rogue monitor table can be added that includes a learned status field that indicates that the rogue device with the MAC address remains learned, e.g. is still in forwarding tables of the.

The flowchart 600 continues to module 614, where learned and aged MAC address in the forwarding tables of switches are monitored. Learned and aged MAC addresses in the forwarding tables of switches can be monitored by an applicable engine for managing forwarding tables of switches, such as forwarding table management engines described in this paper. Depending upon implementation-specific or other considerations, learned and aged MAC addresses in forwarding tables of switches can be monitored by a forwarding table management engine that is implemented as a cloud-based engine. Further depending upon implementation-specific or other consideration, learned and aged MAC address in forwarding tables of switches can be monitored by forwarding table management engines that are implemented on specific switches that include specific forwarding tables that the forwarding table management engines manages.

The flowchart 600 continues to decision point 616 where it is determined whether the MAC address included in the rogue device message that is added to the rogue monitor table is aged out of a forwarding table. An applicable engine for managing a forwarding table, such as a forwarding table management engine described in this paper, can determine whether a MAC address include in the rogue monitor table is aged out of a forwarding table. Specifically, it can be determined whether an entry aged out of a forwarding table includes a MAC address included in an entry in the rogue monitor table.

If it is determined at decision point 616 that the MAC address included in the rogue device message that is added to the rogue monitor table is aged out of a forwarding table is in the rogue monitor table, then the flowchart 600 continues to module 618. At module 618 the flowchart 600 includes sending an aged MAC message that includes aged device data. An aged MAC message that includes aged device data can be sent to a network backhaul rogue device management system. At module 618, a rogue aged MAC message can be sent from a switch that includes a forwarding table from which the MAC address included in the rogue monitor table is aged out. A rogue aged MAC message that is generated and sent at module 618 can be generated and sent by an applicable engine for generating and sending a rogue aged MAC message, such as a rogue learned and aged MAC message engine described in this paper. A rogue aged MAC message sent at module 618 can include aged device data. Aged device data included in an aged MAC message can include the aged MAC address. Aged device data can also include a VLAN ID of a rogue device that has the aged MAC address or a switch with a corresponding forwarding table from which the MAC address is aged. Additionally, if it is determined at decision point 616 that the MAC address in the rogue monitor table is aged out of a forwarding table, then a learned status field in the rogue monitor table can be updated to indicate that the MAC address has been aged out of the forwarding table of a corresponding switch.

If it is determined at decision point 616 that an aged MAC address is not in a rogue monitor table, then the flowchart 600 continues to decision point 620, where it is determined if a new learned MAC address is in the rogue monitor table. An applicable engine for managing a forwarding table, such as a forwarding table management engine described in this paper, can determine whether a MAC address include in a rogue monitor table is newly learned in a forwarding table. Specifically, it can be determined whether an entry newly learned in a forwarding table includes a MAC address included in an entry in the rogue monitor table.

If it is determined at decision point 620 that a new learned MAC address in a forwarding table is not in a rogue monitor table, then the flowchart 600 continues back to module 614, where learned and aged MAC address in the forwarding table are monitored. If it is determined at decision point 620 that a new learned MAC address in a forwarding table is in a rogue monitor table, then the flowchart 600 continues to module 622. At module 622 a probe procedure is initiated to determine a nearest switch to a rogue device with a new learned MAC address in a forwarding table. An applicable probe procedure for determining a nearest switch, such as a probe procedure described in this paper, can be initiated at module 622. Additionally, if it is determined at decision point 620 that the MAC address in the rogue monitor table is newly learned in a forwarding table, then a learned status field in the rogue monitor table can be updated to indicate that the MAC address has been newly learned in a forwarding table of a corresponding switch.

The flowchart 600 continues to module 624, where a rogue learned MAC address that includes new learned device data of a rogue device of the new learned MAC address is sent. A new learned MAC message that includes new learned device data can be sent to a network backhaul rogue device management system. At module 624, a new learned MAC message can be sent from a switch that includes a forwarding table in which the MAC address included in the rogue monitor table is newly learned. A new learned MAC message that is generated and sent at module 624 can be generated and sent by an applicable engine for generating and sending a new learned MAC message, such as a rogue learned and aged MAC message engine described in this paper. A new learned MAC message sent at module 618 can include new learned device data. New learned device data included in a new learned MAC message can include the new learned MAC address. New learned device data can also include a VLAN ID of a rogue device that has the new learned MAC address or a switch with a corresponding forwarding table from which the MAC address is aged.

Figure 7:
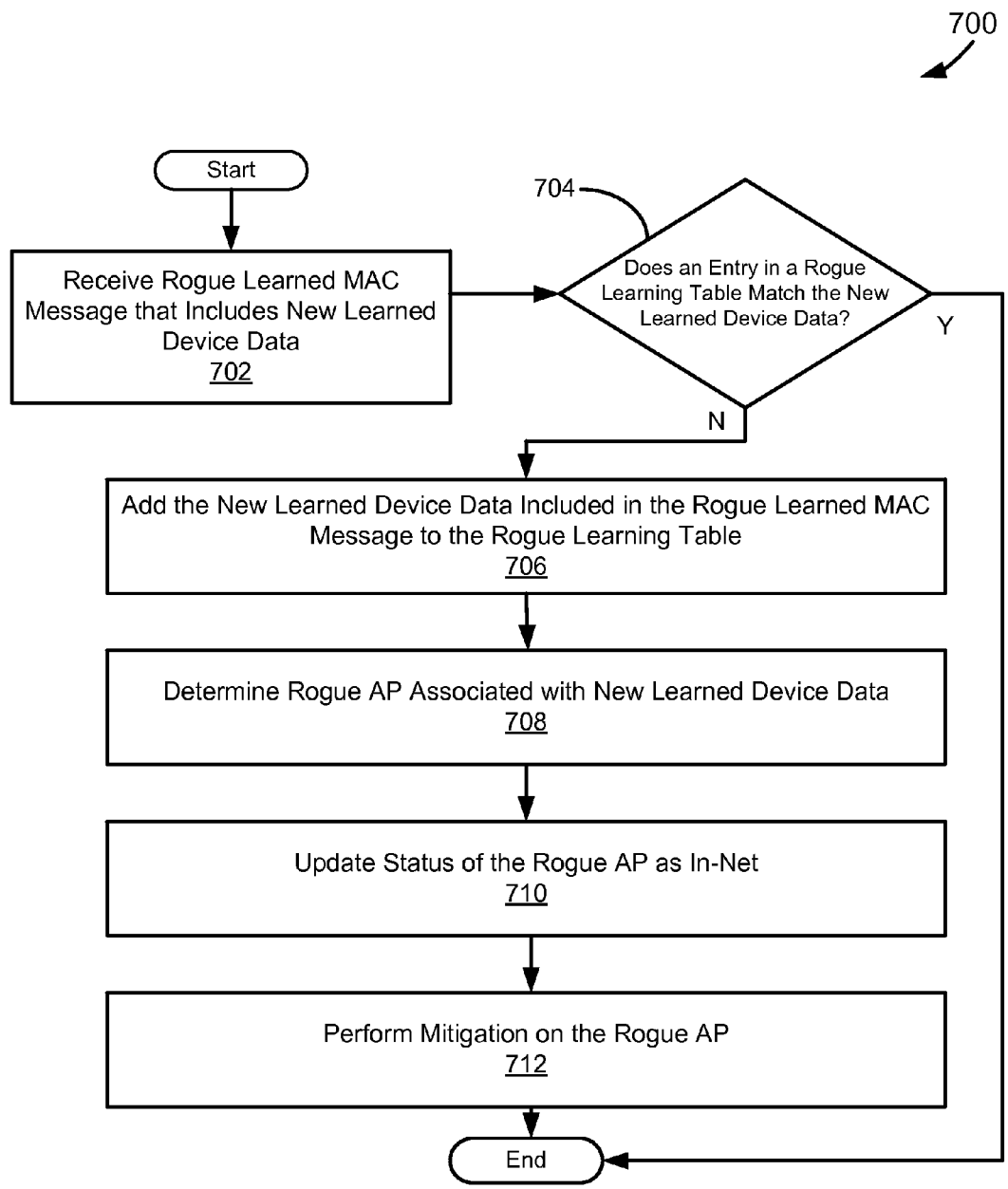
FIG. 7 depicts a flowchart of an example of a method for managing a rogue device with a MAC address that is newly learned in a backhaul of a network.

FIG. 7 depicts a flowchart 700 of an example of a method for managing a rogue device with a MAC address that is newly learned in a backhaul of a network. The flowchart 700 begins at module 702, where a rogue learned MAC message that includes new learned device data is received. A rogue learned MAC message that includes new learned device data can be received by an applicable system for managing a rogue device using backhaul of a network, such as a network backhaul rogue device management system described in this paper. New learned device data included in a rogue learned MAC message received at module 702, can include a MAC address of a rogue device that is newly learned in a forwarding table. New learned device data included in a rogue learned MAC message received at module 702, can also include a VLAN ID of a rogue device with a MAC address that is newly learned in a forwarding table. A VLAN ID of a rogue device with a MAC address that is newly learned in a forwarding table can be learned using a probe procedure to determine a nearest switch to the rogue device.

The flowchart 700 continues to decision point 704, where it is determined whether an entry in a rogue learning table matches the new learned device data included in the rogue learned MAC message received at module 702. An applicable engine for managing a rogue learning table, such as a rogue learning table management engine descried in this paper, can determine whether an entry in a rogue learning table matches the new learned device data. In determining whether the new learned device data included in the rogue learned MAC message matches an entry in a rogue learning table, it can be determined whether an entry in the rogue learning table includes a new learned MAC address that is included as part of the new learned device data.

If it is determined at decision point 704 that an entry in a rogue learning table does not match the new learned device data included in the rogue learned MAC message received at module 702, then the flowchart 700 continues to module 706. At module 706, the new learned device data included in the rogue learned MAC message is added to the rogue learning table. The new learned device data can be added to the rogue learning table by an applicable engine for managing a rogue learning table, such as a rogue learning table management engine described in this paper. In adding new learned device data to the rogue learning table, an entry can be created in the rogue learning table that includes either or both the MAC address of a rogue device included in the new learned device data and a VLAN ID of the rogue device included in the new learned device data. Further, if it is determined at decision point 704 that an entry in a rogue learning table does not match the new learned device data included in the rogue learned MAC message received at module 702, the MAC address of a rogue device included in the new learned device data can be added to a rogue AP table.

The flowchart 700 continues to module 708, where a rogue access point associated with the new learned device data is determined. Depending upon implementation-specific or other considerations, the new learned device data includes a newly learned MAC address of a rogue device that is a rogue AP. As a result, a rogue AP associated with the new learned device data is determined directly from the new learned device data. Further depending upon implementation-specific or other considerations, the new learned device data includes a newly learned MAC address of a rogue device that is a rogue client. A rogue AP associated with the new learned device data that includes a newly learned MAC address of a rogue device that is a rogue client device, can be determined by looking up the newly learned MAC address in a rogue AP table, and determining the identification of the rogue AP associated with the rogue client device. Depending upon implementation-specific or other considerations, the new learned device data can include a MAC address of a rogue device that is a rogue client and a MAC address of a rogue AP to which the rogue client is coupled. As a result, even if the new learned device data includes a newly learned MAC address of a rogue device that is a rogue client, a rogue AP associated with the new learned device data can be determined directly from the new learned device data.

The flowchart 700 continues to module 710 where the status of the rogue AP determined at module 708 is updated as In-Net. The flowchart 700 continues to module 712, where mitigation is performed on the rogue AP. Mitigation performed on the rogue AP can include blocking traffic on one or a plurality of switch ports that are coupled to the rogue AP. Mitigation performed on the rogue AP can also include adding the rogue AP to an unauthorized list. An unauthorized list can be maintained by switches in a backhaul of a network and used to block traffic to specific rogue APs based on whether the specific APS are included in the unauthorized list.

Figure 8:
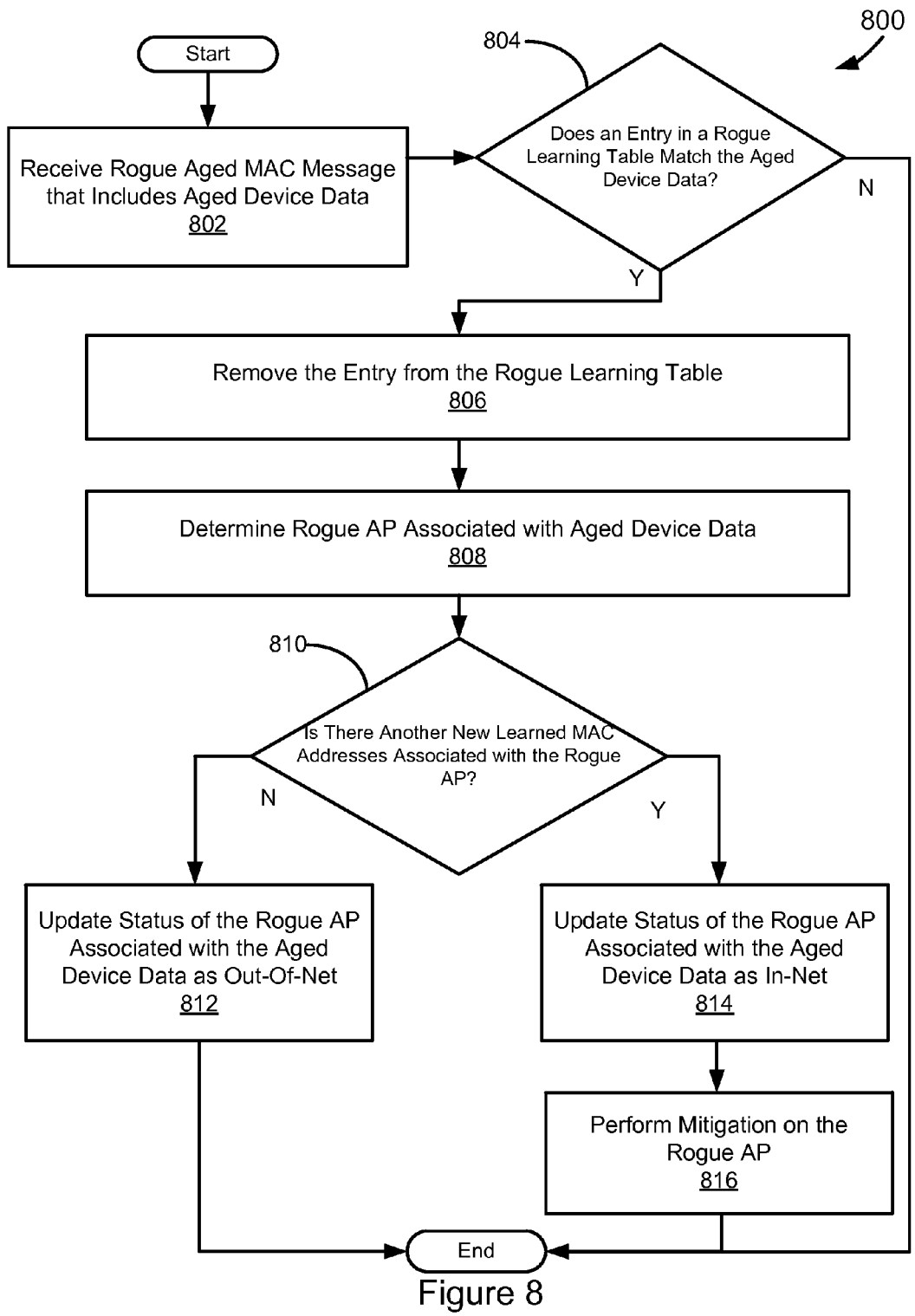
FIG. 8 depicts a flowchart of an example of a method for managing a rogue device with a MAC address that is aged in a backhaul of a network.

FIG. 8 depicts a flowchart 800 of an example of a method for managing a rogue device with a MAC address that is aged in a backhaul of a network. The flowchart 800 begins at module 802, where a rogue aged MAC message that includes aged device data is received. A rogue aged MAC message that includes aged device data can be received by an applicable system for managing a rogue device using a backhaul of a network, such as a network backhaul rogue device management system described in this paper. Aged device data included in a rogue aged MAC message received at module 802, can include a MAC address of a rogue device that aged in a forwarding table. Depending upon implementation-specific or other considerations, a rogue device with a MAC address that is aged out of a backhaul of a network and included as aged device data can be a rogue AP, or a rogue client device. Further depending upon implementation-specific or other considerations, if a rogue device is a rogue client device, aged device data that includes a MAC address of the rogue device can also include a MAC address of a rogue AP to which the rogue client is coupled. Aged device data included in a rogue aged MAC message received at module 802, can also include a VLAN ID of a rogue device with a MAC address that is aged in a forwarding table. A VLAN ID of a rogue device with a MAC address that is aged in a forwarding table can be learned using a probe procedure to determine a nearest switch to the rogue device.

The flowchart 800 continues to decision point 804, where it is determined whether an entry in a rogue learning table matches the aged device data included in the rogue aged MAC message received at module 802. An applicable engine for managing a rogue learning table, such as a rogue learning table management engine descried in this paper, can determine whether an entry in a rogue learning table matches the aged device data. In determining whether the aged device data included in the rogue aged MAC message matches an entry in a rogue learning table, it can be determined whether an entry in the rogue learning table includes an aged MAC address that is included as part of the aged device data.

If it is determined at decision point 804, that an entry in a rogue learning table matches the aged device data included in the rogue aged MAC message received at module 802, then the flowchart 800 continues to module 806, where the entry matched to the aged device data in the rogue learning table is removed from the rogue learning table. An applicable engine for managing the rogue learning table, such as a rogue learning table management engine described in this paper. In removing an entry in the rogue learning table that matches the aged device data, an entry that includes the aged MAC address included in the aged device data can be removed from the rogue learning table.

The flowchart 800 continues to module 808, where a rogue AP associated with the aged device data is determined. Depending upon implementation-specific or other considerations, a rogue AP can be determined from the aged device data, either if the aged MAC address included in the aged device data is for the rogue AP, or if the aged MAC address included in the aged device data is for a rogue client coupled to the rogue AP, and the aged device data includes the MAC address of the rogue AP. Further depending upon implementation-specific or other considerations, a rogue AP can be determined from a rogue AP table that includes an identification of client devices associated with or otherwise coupled to a rogue AP. For example, an aged MAC address of a client device included in the aged device data can be looked up in a rogue AP table to determine a rogue AP associated with the aged device data.

The flowchart 800 continues to decision point 810, where it is determined whether there are other new learned MAC addresses associated with the rogue AP. An applicable system for determining whether there are other new learned MAC addresses associated with the rogue AP, such as a network backhaul rogue device management systems described in this paper, can determine whether there are other new learned MAC addresses associated with the rogue AP. In determining whether other new learned MAC addresses associated with the rogue AP, it can be looked up in the rogue AP table if there are other new learned MAC address associated with the rogue AP. For example, it can be determined whether other rogue clients with new learned MAC addresses are in the rogue AP table. An applicable engine for monitoring a rogue AP table, such as a rogue AP table management engine described in this paper, can look up in a rogue AP table to determine if other new learned MAC address are associated with the rogue AP.

If it is determined at decision point 810 that no other new learned MAC address are associated with the rogue AP, then the flowchart 810 continues to module 812. At module 812, the status of the rogue AP associated with the aged device data is updated to Out-Of-Net. If it is determined at decision point 810 that another new learned MAC addresses is associated with the rogue AP, then the flowchart 800 continues to module 814.

At module 814, the status of the rogue AP associated with the aged device data is updated to In-Net. The flowchart 800 continues to module 816, where mitigation is performed on the rogue AP. Mitigation performed on the rogue AP can include blocking traffic on one or a plurality of switch ports that are coupled to the rogue AP. Mitigation performed on the rogue AP can also include adding the rogue AP to an unauthorized list. An unauthorized list can be maintained by switches in a backhaul of a network and used to block traffic to specific rogue APs based on whether the specific APS are included in the unauthorized list.

Figure 9:
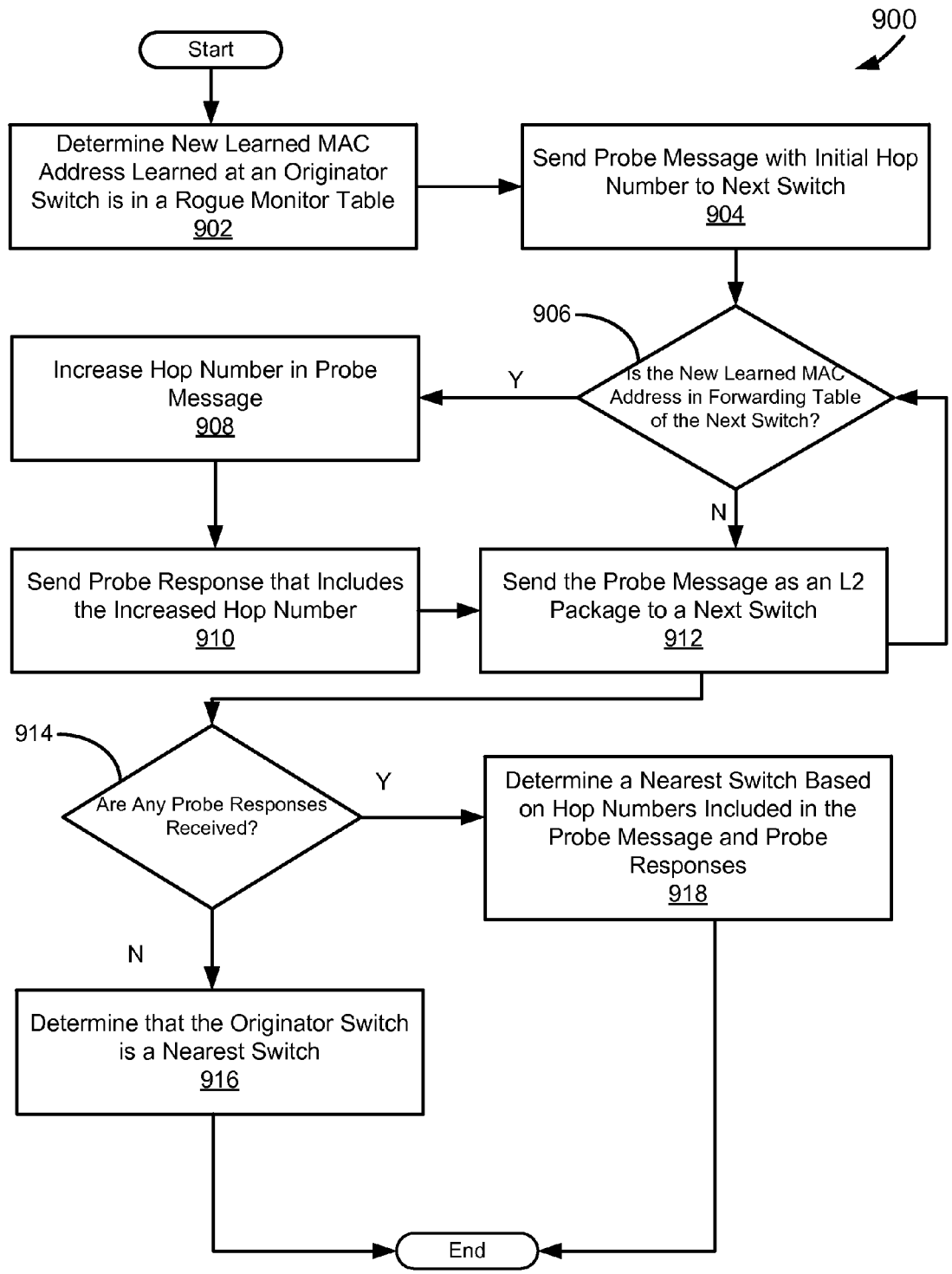
FIG. 9 depicts a flowchart of an example of a probe procedure to determine a nearest switch to a rogue device in a backhaul of a network.

FIG. 9 depicts a flowchart 900 of an example of a probe procedure to determine a nearest switch to a rogue device in a backhaul of a network. The flowchart 900 begins at module 902, where it is determined that a new learned MAC address in a forwarding table at an originator switch is in a rogue monitor table. An applicable engine for managing a forwarding table, such as a forwarding table management engine described in this paper, can determine that a MAC address learned at an originator switch is in a rogue monitor table. A new learned MAC address in a forwarding table at an originator switch can be for a rogue AP or a rogue client device.

The flowchart 900 continues to module 904, where a probe message is sent from the originator switch to the next switch. A probe message can be generated at the originator switch to include an initial hop number. A probe message generated and sent at module 904 can include the new learned MAC address. A hop number included in a probe message generated at the originator switch can be stored as probe data along with an identification of the originator switch. A probe message generated and sent at module 904 can be generated and sent by an applicable engine for generating and sending a probe message, such as a probe message generation engine described in this paper.

The flowchart 900 continues to decision point 906, where it is determined whether the new learned MAC address is in the forwarding table of the next switch. An applicable system for managing a forwarding table of the next switch, such as a forwarding table determination engine described in this paper, can determine whether the new learned MAC address is in the forwarding table of the next switch.

If it is determined at decision point 906 that the new learned MAC address is not in the forwarding table of the next switch, then the flowchart 900 continues to module 912. At module 912, the probe message is sent as a layer 2 package to a next switch. An applicable engine for sending a probe message as a layer 2 package, such as a probe messaging forwarding engine described in this paper, can send the probe message as a layer 2 package to a next switch. After module 912, the flowchart 900 continues back to decision point 906, where it is determined if the new learned MAC address is in a forwarding table of the next switch.

If it is determined at decision point 906 that the new learned MAC address is not in the forwarding table of the next switch, then the flowchart 900 continues to module 908. At module 908, the hop number in the probe message is increased. The hop number in the probe message can be increased at module 908 by an applicable engine for increasing a hop number in a probe message, such as a probe response generation engine described in this paper.

The flowchart 900 continues to module 910 where a probe response that includes the increased hop number is generated and sent back to the originator switch. A probe response generated at module 910 can also include an identification of the switch that has a forwarding table that includes the new learned MAC address. An applicable system for generating and sending a probe response message, such as a probe response generating engine described in this paper. A probe response generated and send at module 910 can be received at an originator switch and stored as probe data.

The flowchart 900 continues to module 912, where the probe message is sent as a layer 2 package to a next switch. The probe message can be sent as a layer 2 package by an applicable engine for sending a probe message, such as a probe message forwarding engine described in this paper. Depending upon implementation-specific or other considerations, the loops formed in the flowchart 900 by decision point 906, module 908, module 910, and module 912 can be repeated until a probe message reaches a rogue device that has the new learned MAC address.

The flowchart 900 continues to decision point 914, where it is determined if any probe responses are received at the originator switch. For example, if no probe responses are received, the switches that the probe message are sent to do not have the new learned MAC address in corresponding forwarding tables for the switches. An applicable engine for determining whether probe responses are received, such as a nearest switch determination engine described in this paper, can determine whether probe responses are received. In determining whether probe response are received, probe data can be checked to determine whether the probe data includes probe responses.

If it is determined at decision point 914, that no probe responses are received, then the flowchart 900 continues to module 916. At module 916, it is determined that the originator switch is a nearest switch. An applicable engine for determining a nearest switch, such as a nearest switch determination engine described in this paper, can determine that the originator switch is a nearest switch if it is determined at decision point 914, that no probe responses are received.

If it is determined at decision point 914 that probe responses are received, then the flowchart 900 continues to module 916, where a nearest switch is determined based on hop numbers included in the probe message and probe responses. For example, it can be determined at module 914 that a switch that sent a probe response with a highest hop number is the nearest switch. A highest hop number and an identification of a switch that sent the probe response with the highest hop number can be determined by an applicable engine for determining a nearest switch, such as a nearest switch determination engine described in this paper. A highest hop number and an identification of switch that sent a probe response with the highest hop number can be determined from probe data that includes probe responses to the probe message and the initial hop number in the probe message. Depending upon implementation-specific or other considerations, multiple probe responses can be received that include the highest hop number, in particular when the probe message is sent in parallel along multiple branches of switches in a backhaul of a network. Probe data can be updated to include an identification, e.g. MAC address, of the one or plurality of switches that are determined to be nearest switches.

Figure 10A:
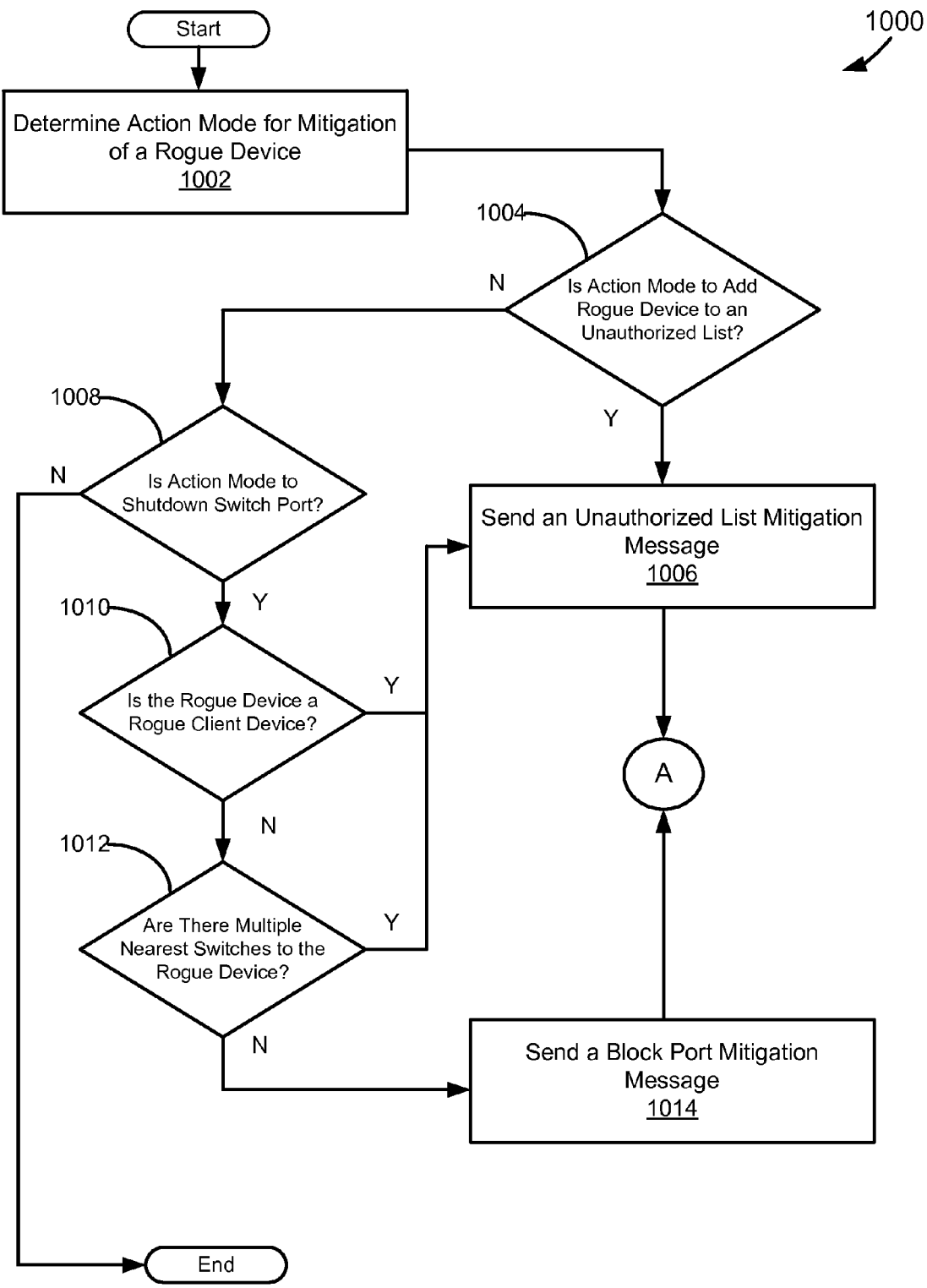
FIGS. 10A and 10B depict a flowchart of an example of a method for mitigating a rogue device managed through a backhaul of a network.
Figure 10B:
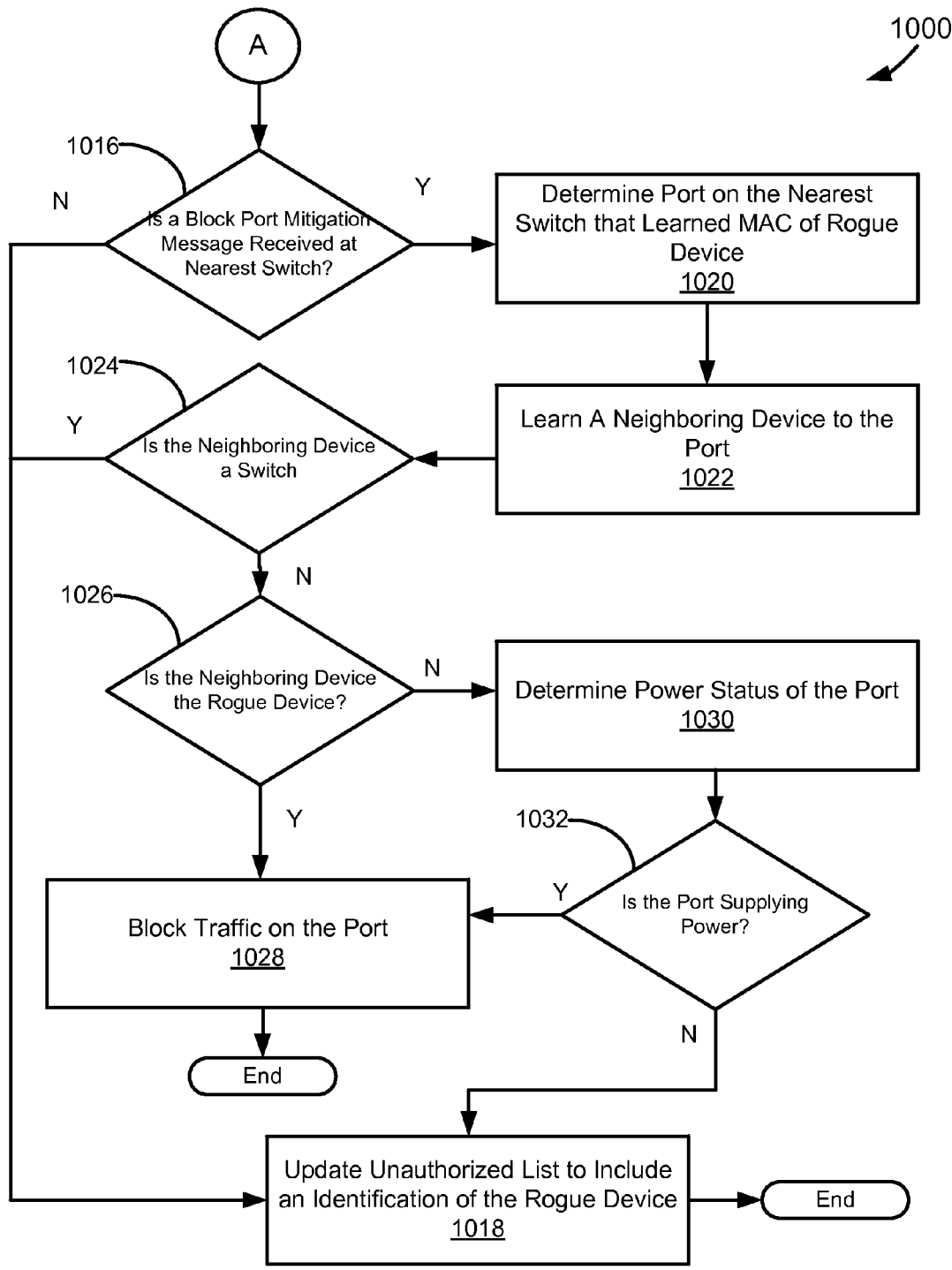

FIGS. 10A and 10B depict a flowchart 1000 of an example of a method for mitigating a rogue device managed through a backhaul of a network. The flowchart 1000 begins at module 1002 where an action mode for mitigating a rogue device is determined. An action mode for mitigation of a rogue device can be determined at module 1002 from policies of a network. For example, if network policies specify to add a rogue device to an unauthorized list, then it can be determined at module 1002 that an action mode for mitigation is adding the rogue device to the unauthorized list. An action mode for mitigation of a rogue device can also be determined at module 1002 by querying a network administrator for a specific action mode.

The flowchart 1000 continues to decision point 1004, where it is determined if an action mode determined at module 1002 is to add the rogue device to an unauthorized list. An applicable engine for determining an action mode, such as an action mode determination engine, can determine whether the action mode is to add the rogue device to an unauthorized list. An unauthorized list that the rogue device is added to can indicate to switches in the backhaul of a network to not forward traffic destined to or received from the rogue device.

If it is determined at decision point 1004 that the action mode for the rogue device is to add the device to an unauthorized list, then the flowchart 1000 continues to module 1006. At module 1006, an unauthorized list mitigation message is generated and sent to an applicable recipient, such as switches in a backhaul of a network or a system or engine responsible for maintaining an unauthorized list. An unauthorized list mitigation message can be generated and sent by an applicable engine for generating and sending a mitigation message, such as a mitigation message generation engine described in this paper. An unauthorized list mitigation message generated and sent at module 1006 can identify that the determined action mode for mitigation of the rogue device is adding the rogue device to the unauthorized list. A mitigation message generated and sent at module 1006 can also include a MAC address of the rogue device, a BSS ID of the rogue device, and a VLAN ID of the rogue device.

If it is determined at decision point 1004 that the action mode for the rogue device is not to add the device to an unauthorized list, then the flowchart continues 1000 continues to decision point 1008. At decision point 1008 it is determined whether the action mode determined at module 1002 is to shut down a switch port of a nearest switch through which the rogue device is coupled to the nearest switch. An applicable engine for determining an action mode for mitigation of a rogue device, such as an action mode determination engine described in this paper, can determine whether an action mode determined at module 1002 is to shut down a switch port of a nearest switch through which the rogue device is coupled to the nearest switch.

If it is determined at decision point 1008 that the action mode determined at module 1002 is to shut down a switch port of a nearest switch through which the rogue device is coupled to the nearest switch, then the flowchart 1000 continues to decision point 1010. At decision point 1010, it is determined whether the rogue device is a rogue client device or a rogue AP device. An applicable engine for determining a device type of a rogue device, such as a rogue device type determination engine described in this paper, can determine whether the rogue device is a rogue client device or a rogue AP. It can be determined whether a rogue device is a rogue client or a rogue AP by looking up the MAC address of the rogue device in a rogue AP table. For example, if the MAC address of the rogue device in the rogue AP table indicates that there are devices that are connected to the rogue device, then it can be determined that the rogue device is a rogue AP.

If it is determined at decision point 1010, that the rogue device is a rogue client device, then the flowchart 1000 continues to module 1006. At module 1006, an unauthorized list mitigation message is generated and sent for the rogue device. If it is determined at decision point 1010 that the rogue device is a rogue AP, then the flowchart 1000 continues to decision point 1012.

At decision point 1012, it is determined whether there are multiple nearest switches to the rogue device. Multiple nearest switches to the rogue device using an applicable technique for determining nearest switches to a client device, such as a probe procedure described in this paper. An applicable system for determining whether there are multiple nearest switches to the rogue device, such as the nearest switch monitoring engine, can determine whether there are multiple nearest switches to the rogue device. If it is determined at decision point 1012 that there are multiple nearest switches to the rogue device, then the flowchart 1000 continues to module 1006, where an unauthorized list mitigation message is generated and sent for the rogue device.

If it is determined at decision point 1012, that there are not multiple nearest switches to the rogue device, then the flowchart 1000 continues to module 1014. At module 1014 a block port mitigation message is generated and sent to the nearest switch to the rogue device. A block port mitigation message can be generated and sent by an applicable engine for generating and sending a mitigation message, such as a mitigation message generation engine described in this paper. A block port mitigation message generated and sent at module 1014 can identify that the determined action mode for mitigation of the rogue device is to block the port through which the rogue device is coupled to the nearest switch. A block portion mitigation message generated and sent at module 1014 can also include a MAC address of the rogue device, a BSS ID of the rogue device, and a VLAN ID of the rogue device.

The flowchart 1000 continues to decision point 1016, where it is determined whether a block port mitigation message is received at the nearest switch. A block port mitigation message can be received at module 1016 from a network backhaul rogue device management system.

If it is determined at decision point 1016, that a block port mitigation message is not received at the nearest switch, then the flowchart 1000 continues to module 1018. At module 1018, an unauthorized list utilized by the nearest switch is updated to include an identification of the rogue device, e.g. a MAC address of the rogue device. An applicable system for managing an unauthorized list, such as an unauthorized list management engine described in this paper, can update an unauthorized list to include an identification of the rogue device.

If it is determined at decision point 1016, that a block port mitigation message is received at the nearest switch, then the flowchart 1000 continues to module 1020. At module 1020, a port on the nearest switch that learned a MAC address of a rogue device, and thereby the port through which the rogue device is coupled to the nearest switch is determined. An applicable engine for determining a port on a nearest switch, such as a port determination engine described in this paper, can determine a port of the nearest switch through which the rogue device is coupled to the nearest switch.

The flowchart continues to module 1022 where a neighboring device to the port determined at module 1022 is determined. An applicable engine for determining neighboring devices to the port, such as a neighboring device determination engine described in this paper, can determine neighboring devices to the port.

The flowchart continues to decision point 1024 where it is determined whether a neighboring device to the port is a switch. An applicable system for determining neighboring devices to the port, such as a neighboring device determination engine described in this paper, can determine whether the neighboring device is a switch. Whether the neighboring device is a switch can be determined based on a MAC address of the neighboring device. If it is determined at decision point 1024 that a neighboring device to the port is a switch, then the flowchart 1000 continues to module 1018, where an unauthorized list is updated to include an identification of the rogue device.

If it is determined at decision point 1024, that a neighboring device to the port is not a switch, then the flowchart 1000 continues to decision point 1026. At decision point 1026, it is determined whether the neighboring device is the rogue device. An applicable engine for determining whether the rogue device is a neighboring device to the port, such as the neighboring device determination engine described in this paper, can determine whether the a neighboring device is the rogue device. If it is determined that the neighboring device is the rogue device, then the flowchart 1000 continues to module 1028, where all traffic is blocked on the port. An applicable system for blocking all traffic on a port, such as a port management engine described in this paper, can block all traffic on the port at module 1028.

If it is determined at decision point 1026, that the neighboring device is not the rogue device, then the flowchart 1000 continues to module 1030. At module 1030, a power status of the port is determined. An applicable system for determining power of a port, such as a port power determination engine described in this paper, can determine a power status of a the port. A power status of a port determined at module 1030 can include whether or not the port is supplying power to devices coupled to the port.

The flowchart 1000 continues to decision point 1032 where it is determined whether port is supplying power to devices coupled to the port. An applicable system for determining whether a port is supplying power, such as a port power determination engine described in this paper, can determine whether the port is supplying power to devices coupled to the switch through the port. If it is determined that the port is not supplying power to devices coupled to the nearest switch through the port, then the flowchart continues to module 1018, where an unauthorized list is updated to include an identification of the rogue device, e.g. a MAC address of the rogue device. If it is determined at decision point 1032, that the power is supplying power to devices coupled to the nearest switch through the port, then the flowchart 1000 continues to module 1028, where all on the port is blocked.

Figure 11:
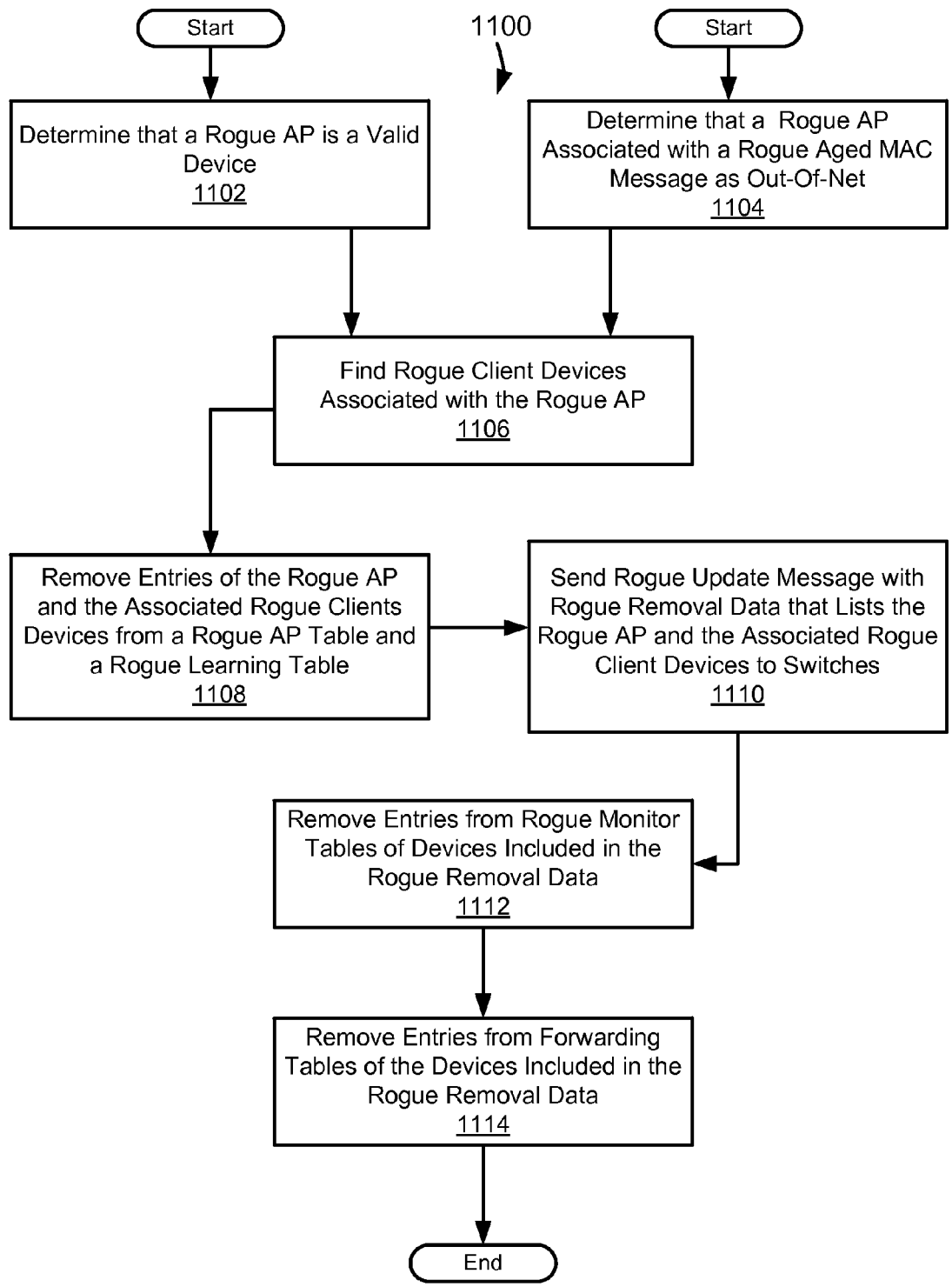
FIG. 11 depicts a flowchart of an example of a method for managing rogue APs that are determined to be valid devices or are Out-Of-Net using a backhaul of a network.

FIG. 11 depicts a flowchart 1100 of an example of a method for managing rogue APs that are determined to be valid devices or are Out-Of-Net using a backhaul of a network. The flowchart 1100 begins at module 1102, where it is determined that a rogue AP is a valid device for a network. Whether a rogue AP is a valid device, i.e. is authorized for the network and is not a rogue device, can be determined from either policies of a network or form input received from an administrator of a network. For example it can be determined that a rogue AP is a valid device if it is determined that the rogue AP complies with policies for a network. In another example, it can be determined that a rogue AP is a valid device if input is received from a network administrator, indicating that the rogue AP is a valid device. An applicable system for determining whether or not a rogue AP is a valid device, such as a rogue device status determination engine described in this paper, can determine that a rogue AP is a valid device.

Alternatively, the flowchart 1100 can begin at module 1104 where it is determined that a rogue AP has Out-Of-Net status. It can be determined that a rogue AP has Out-Of-Net status based on aged device data that is included in an aged MAC message received from a switch in a backhaul of a network. An applicable system for determining a status of a rogue AP, such as a rogue device status determination engine described in this paper, can determine that a rogue AP has Out-Of-Net status.

Regardless of whether the flowchart 1100 begins at module 1102 or 1104, the flowchart 1100 continues to module 1106. At module 1106, rogue client devices associated with the rogue AP are determined. Rogue client devices associated with the rogue AP, e.g. connected at some time to the rogue AP, can be determined from a rogue AP table. For example, a MAC address of the rogue AP can be used to determine the rogue client devices that are associated with the rogue AP from a rogue AP table. An applicable system for determining rogue client device associated with a rogue AP, such as a rogue AP table management engine described in this paper, can determine rogue client devices associated with the rogue AP.

The flowchart 1100 continues to module 1108, where entries of the rogue AP and rogue client device associated with the rogue AP are removed from the rogue AP table and a rogue learning table. An applicable system for managing a rogue AP table, such as a rogue AP table management engine described in this paper, can remove entries of the rogue AP and the rogue client devices associated with the rogue AP from the rogue AP table. An applicable system for managing a rogue learning table, such as a rogue learning table management engine described in this paper, can remove entries of the rogue AP and the rogue client devices associated with the rogue AP from a rogue learning table.

The flowchart 1100 continues to module 1110, where a rogue update message with rogue removal data is sent to switches in the backhaul of a network. Rogue removal data included in a rogue update message sent at module 1110 can include a list of identifications, e.g. MAC addresses, of the rogue AP and the rogue client devices associated with the rogue AP that are removed from the rogue AP table and the rogue learning table. An applicable system for generating and sending a rogue update message, such as a rogue device message engine described in this paper, can generate and send a rogue update message that includes rogue removal data that includes a list of identification of the rogue AP and the rogue client devices associated with the rogue AP that are removed from the rogue AP table and the rogue learning table.

The flowchart 1100 continues to module 1112, where devices included in the rogue removal data of a rogue update message are removed from rogue monitor tables. An applicable engine for managing a rogue monitor table, such as a rogue monitor table management engine described in this paper, can remove entries of the rogue AP or rogue client devices associated with the rogue AP from rogue monitor tables.

The flowchart 1100 continues to module 1114, where devices included in the rogue removal data of a rogue update message are removed from forwarding tables of switches in a backhaul of a network. An applicable engine for managing forwarding tables of switches, such as a forwarding table management engine described in this paper, can remove devices included in the rogue removal data from forwarding tables of switches in a backhaul of a network.

Figure 12:
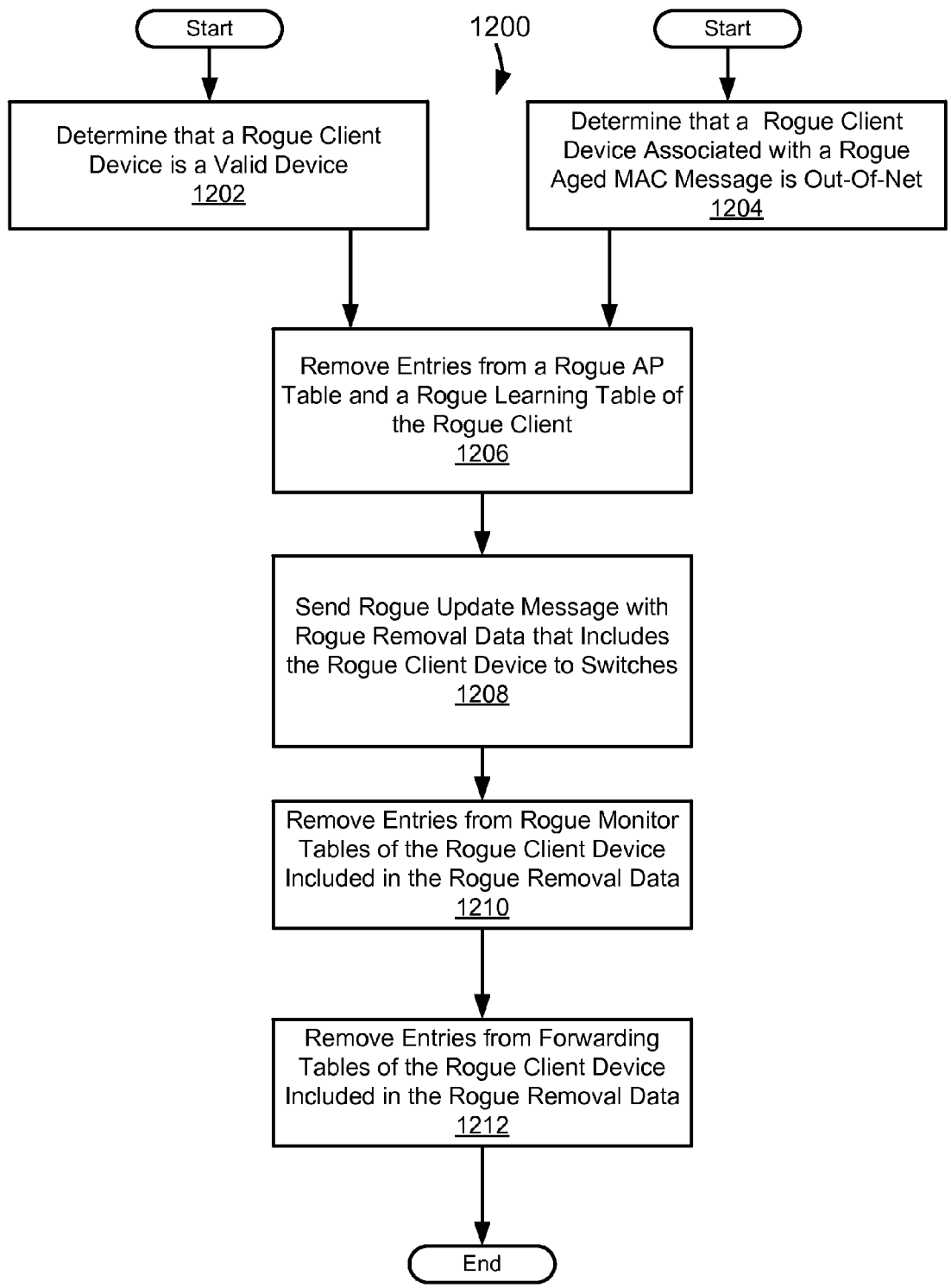
FIG. 12 depicts a flowchart of an example of a method for managing rogue client devices that are determined to be valid devices or are Out-Of-Net using a backhaul of a network.

FIG. 12 depicts a flowchart 1200 of an example of a method for managing rogue client devices that are determined to be valid devices or are Out-Of-Net using a backhaul of a network. The flowchart 1200 begins at module 1202, where it is determined that a rogue client device is a valid device for a network. Whether a rogue client device is a valid device, i.e. is authorized for the network and is not a rogue device, can be determined from either policies of a network or from input received from an administrator of a network. For example it can be determined that a rogue client device is a valid device if it is determined that the rogue client device complies with policies for a network. In another example, it can be determined that a rogue client device is a valid device if input is received from a network administrator, indicating that the rogue client device is a valid device. An applicable system for determining whether or not a rogue client device is a valid device, such as a rogue device status determination engine described in this paper, can determine that a rogue client device is a valid device.

Alternatively, the flowchart 1200 can begin at module 1204 where it is determined that a rogue client device has Out-Of-Net status. It can be determined that a rogue client device has Out-Of-Net status based on aged device data that is included in an aged MAC message received from a switch in a backhaul of a network. An applicable system for determining a status of a rogue client device, such as a rogue device status determination engine described in this paper, can determine that a rogue client device has Out-Of-Net status.

Regardless of whether the flowchart 1200 begins at module 1202 or 1204, the flowchart 1200 continues to module 1206. At module 1206, entries of the rogue client device are removed from the rogue AP table and a rogue learning table. An applicable system for managing a rogue AP table, such as a rogue AP table management engine described in this paper, can remove entries of the rogue client device. An applicable system for managing a rogue learning table, such as a rogue learning table management engine described in this paper, can remove entries of the rogue client device from a rogue learning table.

The flowchart 1200 continues to module 1208, where a rogue update message with rogue removal data is sent to switches in the backhaul of a network. Rogue removal data included in a rogue update message sent at module 1208 can include an identification, e.g. MAC addresses, of the rogue client device that is removed from the rogue AP table and the rogue learning table. An applicable system for generating and sending a rogue update message, such as a rogue device message engine described in this paper, can generate and send a rogue update message that includes rogue removal data that includes an identification of the rogue client device that is removed from the rogue AP table and the rogue learning table.

The flowchart 1200 continues to module 1210, where a rogue device included in the rogue removal data of a rogue update message is removed from rogue monitor tables. An applicable engine for managing a rogue monitor table, such as a rogue monitor table management engine described in this paper, can remove entries of the rogue client device from rogue monitor tables.

The flowchart 1200 continues to module 1212, where the rogue client device included in the rogue removal data of a rogue update message are removed from forwarding tables of switches in a backhaul of a network. An applicable engine for managing forwarding tables of switches, such as a forwarding table management engine described in this paper, can remove the rogue client device included in the rogue removal data from forwarding tables of switches in a backhaul of a network.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
   detecting a rogue device in a network;
   sending a rogue device message that includes an identification of the rogue device to a plurality of switches in a backhaul of the network;
   adding the identification of the rogue device into a rogue monitor table including a learned status field indicating whether the rogue device is In-Net or Out-Of-Net;
   determining whether the rogue device is In-Net or Out-Of-Net using forwarding tables of the plurality of switches in the backhaul of the network and the rogue monitor table by removing entries in the forwarding tables that include a MAC address of the rogue device and determining whether a new learned MAC address in the forwarding tables is the MAC address of the rogue device;
   when it is determined that the rogue device is In-Net, performing mitigation of the rogue device using a nearest switch to the rogue device of the plurality of switches in the backhaul of the network;
   updating the rogue monitor table to indicate an identification of the nearest switch to the rogue device and updating the learned status field to indicate that the rogue device is In-Net.

2. The method of claim 1, wherein the rogue device is a rogue client device, the method further comprising:
   determining a rogue access point associated with the rogue device using a rogue AP table;
   performing mitigation of the rogue access point using the nearest switch to the rogue device.

3. The method of claim 1, wherein determining whether the rogue device is In-Net or Out-Of-Net using the forwarding tables of the plurality of switches in the backhaul of the network and the rogue monitor table comprises:
   removing entries in the forwarding tables that include a MAC address of the rogue device;
   determining that an aged MAC address in the forwarding tables is the MAC address of the rogue device;
   determining a rogue access point associated with the rogue device using a rogue AP table;
   determining if a MAC address of a device associated with the rogue access point is included as an entry in the forwarding tables using a rogue learning table;
   when it is determined that the MAC address of the device associated with the rogue access point is included as an entry in the forwarding tables, determining that the rogue device is In-Net.

4. The method of claim 3, wherein the rogue access point associated with the rogue device is the rogue device.

5. The method of claim 3, wherein the rogue device is a rogue client device and the rogue access point associated with the rogue device is the rogue access point that the rogue device is coupled to.

6. The method of claim 1, wherein performing mitigation of the rogue device comprises:
   determining an action mode for mitigation of the rogue device;
   sending an unauthorized list mitigation message, used in performing mitigation of the rouge device, to the nearest switch, if the determined action mode for mitigation of the rogue device is adding the rogue device to an unauthorized list.

7. The method of claim 1, wherein performing mitigation of the rogue device comprises:
   determining an action mode for mitigation of the rogue device;
   determining whether the rogue device is a rogue client device;
   determining if there are multiple nearest switches to the rogue device;
   sending a block port mitigation message, used in performing mitigation of the rogue device, to the nearest switch, when it is determined that the determined action mode for mitigation of the rogue device is blocking all traffic on a port through which the rogue device is coupled to the
   nearest switch, the rogue device is the rogue client device, and there is only a single nearest switch to the rogue device.

8. The method of claim 1, further comprising:
   generating, at an originator switch, a probe message with an initial hop number;
   sending the probe message with the initial hop number to at least one next switch;
   receiving probe responses that include an increased hop number;
   determining that a switch that sent a probe response with a largest increased hop number is the nearest switch to the rogue device.

9. The method of claim 1, further comprising:
   generating, at an originator switch, a probe message with an initial hop number;
   sending the probe message with the initial hop number to at least one next switch;
   determining that the originator switch is the nearest switch to the rogue device when a probe response that includes an increased hop number is not received from the at least one next switch.

10. A system comprising:
  a detector access point configured to detect a rogue device in a network;
  a rogue device message engine configured to send a rogue device message that includes an identification of the rogue device to a plurality of switches in a backhaul of the network;
  a rogue monitor table management engine configured to add the identification of the rogue device into a rogue monitor table including a learned status field indicating whether the rogue device is In-Net or Out-Of-Net;
  a rogue device status determination engine configured to determine whether the rogue device is In-Net or Out-Of-Net using forwarding tables of the plurality of switches in the backhaul of the network and the rogue monitor by removing entries in the forwarding tables that include a MAC address of the rogue device and determining whether a new learned MAC address in the forwarding tables is the MAC address of the rogue device;
  a network backhaul rogue device management system configured to perform mitigation of the rogue device using a nearest switch to the rogue device of the plurality of switches in the backhaul of the network, when it is determined that the rogue device is In-Net;
  wherein the rogue monitor table management engine is further configured to update the rogue monitor table to indicate an identification of the nearest switch to the rogue device and update the learned status field to indicate that the rouge device is In-Net.

11. The system of claim 10, wherein the rogue device is a rogue client device, the network backhaul rogue device management system further configured to:
  determine a rogue access point associated with the rogue device using a rogue AP table;
  perform mitigation of the rogue access point using the nearest switch to the rogue device.

12. The system of claim 10, further comprising:
  a forwarding table management engine configured to:
  remove entries in the forwarding tables that include a MAC address of the rogue device;
  determine that an aged MAC address in the forwarding tables is the MAC address of the rogue device;
  wherein the network backhaul rogue device management system is further configured to:
  determine a rogue access point associated with the rogue device using a rogue AP table;
    determine if a MAC address of a device associated with the rogue access point is included as an entry in the forwarding tables using a rogue learning table;
  wherein the rogue device status determination engine is further configured to determine that the rogue device is In-Net, when it is determined that the MAC address of the device associated with the rogue access point is included as an entry in the forwarding tables.

13. The system of claim 12, wherein the rogue access point associated with the rogue device is the rogue device.

14. The system of claim 12, wherein the rogue device is a rogue client device and the rogue access point associated with the rogue device is the rogue access point that the rogue device is coupled to.

15. The system of claim 10, further comprising:
  an action mode determination engine configured to determine an action mode for mitigation of the rogue device;
  a mitigation message generation engine configured to send an unauthorized list mitigation message, used in performing mitigation of the rogue device, to the nearest switch, when the determined action mode for mitigation of the rogue device is adding the rogue device to an unauthorized list.

16. The system of claim 10, further comprising:
  an action mode determination engine configured to determine an action mode for mitigation of the rogue device;
  a rogue device type determination engine configured to determine whether the rogue device is a rogue client device;
  a nearest switch monitoring engine configured to determine if there are multiple nearest switches to the rogue device;
  a mitigation message generation engine configured to send a block port mitigation message, used in performing mitigation of the rogue device, to the nearest switch, when it is determined that the determined action mode for mitigation of the rogue device is blocking all traffic on a port through which the rogue device is coupled to the nearest switch, the rogue device is the rogue client device, and there is only a single nearest switch to the rogue device.

17. The system of claim 10, further comprising an originator switch probe management system configured to:
  generate, at an originator switch, a probe message with an initial hop number;
  send the probe message with the initial hop number to at least one next switch;
  receive probe responses that include an increased hop number;
  determine that a switch that sent a probe response with a largest increased hop number is the nearest switch to the rogue device.

18. The system of claim 10, further comprising an originator switch probe management system configured to:
  generate, at an originator switch, a probe message with an initial hop number;
  send the probe message with the initial hop number to at least one next switch;
  determine that the originator switch is the nearest switch to the rogue device when a probe response that includes an increased hop number is not received from the at least one next switch.

19. A system comprising:
  means for detecting a rogue device in a network;
  means for sending a rogue device message that includes an identification of the rogue device to a plurality of switches in a backhaul of the network;
  means for adding the identification identity of the rogue device into a rogue monitor table including a learned status field indicating whether the rogue device is In-Net or Out-Of-Net;
  means for determining whether the rogue device is In-Net or Out-Of-Net using forwarding tables of the plurality of switches in the backhaul of the network and the rogue monitor table by removing entries in the forwarding tables that include a MAC address of the rogue device and determining whether a new learned MAC address in the forwarding tables is the MAC address of the rogue device;
  means for performing mitigation of the rogue device using a nearest switch to the rogue device of the plurality of switches in the backhaul of the network, when it is determined that the rogue device is In-Net;
  means for updating the rogue monitor table to indicate an identification of the nearest switch to the rogue device and updating the learned status field to indicate that the rouge device is In-Net.

* * * * *